(12) United States Patent
Chemel et al.

(10) Patent No.: US 9,915,416 B2
(45) Date of Patent: Mar. 13, 2018

(54) METHOD, APPARATUS, AND SYSTEM FOR OCCUPANCY SENSING

(71) Applicant: Digital Lumens, Inc., Boston, MA (US)

(72) Inventors: Brian Chemel, Marblehead, MA (US); Colin N. Piepgras, Swampscott, MA (US); Frederick Morgan, Canton, MA (US)

(73) Assignee: Digital Lumens Inc.

( * ) Notice: Subject to any disclaimer, the term of this patent is extended or adjusted under 35 U.S.C. 154(b) by 277 days.

(21) Appl. No.: 14/645,548

(22) Filed: Mar. 12, 2015

(65) Prior Publication Data
US 2015/0184842 A1    Jul. 2, 2015

Related U.S. Application Data

(63) Continuation of application No. 13/289,492, filed on Nov. 4, 2011, now Pat. No. 9,014,829.

(60) Provisional application No. 61/409,991, filed on Nov. 4, 2010.

(51) Int. Cl.
| | | |
|---|---|---|
| *F21V 23/04* | (2006.01) | |
| *G01D 18/00* | (2006.01) | |
| *H05B 37/02* | (2006.01) | |

(52) U.S. Cl.
CPC .......... *F21V 23/0471* (2013.01); *G01D 18/00* (2013.01); *H05B 37/0227* (2013.01)

(58) Field of Classification Search
CPC ............................ F21V 23/0471; G01D 18/00
USPC ....................................................... 702/104
See application file for complete search history.

(56) References Cited

U.S. PATENT DOCUMENTS

| | | |
|---|---|---|
| 2,899,541 A | 8/1957 | De Mauro |
| D185,410 S | 6/1959 | Bodian |
| D191,530 S | 10/1961 | Zurawski |
| D200,548 S | 3/1965 | Reeves |
| 4,194,181 A | 3/1980 | Brundage |
| 4,217,646 A | 8/1980 | Caltagirone et al. |

(Continued)

FOREIGN PATENT DOCUMENTS

| | | |
|---|---|---|
| CN | 1873908 A | 12/2006 |
| JP | 2005-073133 | 3/1993 |

(Continued)

OTHER PUBLICATIONS

Notice of Allowance in U.S. Appl. No. 14/245,196, dated Sep. 9, 2015, 8 pages.

(Continued)

*Primary Examiner* — Yuhui R Pan
(74) *Attorney, Agent, or Firm* — Cooley LLP

(57) ABSTRACT

Embodiments of the present invention include an occupancy sensing unit configured to monitor an environment illuminated by a lighting fixture. An inventive occupancy sensing unit may include an occupancy sensor to detect radiation indicative of at least one occupancy event in the environment illuminated by the lighting fixture according to sensing parameters. The occupancy sensor can be coupled to a memory that logs sensor data, which represent the occupancy events, provided by the occupancy sensor. A processor coupled to the memory performs an analysis of the sensor data logged in the memory and adjusts the sensing parameters of the occupancy sensor based on the analysis.

21 Claims, 11 Drawing Sheets

(56) References Cited

U.S. PATENT DOCUMENTS

| | | |
|---|---|---|
| 4,277,691 A | 7/1981 | Lunn |
| 4,298,922 A | 11/1981 | Hardwick |
| 4,558,275 A | 12/1985 | Borowy et al. |
| 4,755,920 A | 7/1988 | Tinley |
| 4,772,825 A | 9/1988 | Tabor et al. |
| 4,780,731 A | 10/1988 | Creutzmann et al. |
| D300,471 S | 3/1989 | Szymanek |
| 4,873,469 A | 10/1989 | Young et al. |
| 5,055,985 A | 10/1991 | Fabbri |
| 5,144,222 A | 9/1992 | Herbert |
| 5,323,334 A | 6/1994 | Meyers et al. |
| 5,430,356 A | 7/1995 | Ference et al. |
| 5,455,487 A | 10/1995 | Mix et al. |
| 5,521,852 A | 5/1996 | Hibbs et al. |
| 5,521,853 A | 5/1996 | Hibbs et al. |
| D374,301 S | 10/1996 | Kleffman |
| 5,566,084 A | 10/1996 | Cmar |
| 5,572,237 A | 11/1996 | Crooks et al. |
| 5,572,239 A | 11/1996 | Jaegar |
| 5,640,792 A | 6/1997 | Smith et al. |
| 5,655,833 A | 8/1997 | Raczynski |
| 5,668,446 A | 9/1997 | Baker |
| 5,739,639 A | 4/1998 | Johnson |
| 5,753,983 A | 5/1998 | Dickie et al. |
| 5,764,146 A | 6/1998 | Baldwin et al. |
| 5,895,986 A | 4/1999 | Walters et al. |
| 5,914,865 A | 6/1999 | Barbehenn et al. |
| 5,945,993 A | 8/1999 | Fleischmann |
| 5,971,597 A | 10/1999 | Baldwin et al. |
| 6,016,038 A | 1/2000 | Mueller et al. |
| 6,025,679 A | 2/2000 | Harper et al. |
| 6,028,396 A | 2/2000 | Morrissey, Jr. et al. |
| 6,028,597 A | 2/2000 | Ryan et al. |
| 6,035,266 A | 3/2000 | Williams et al. |
| 6,092,913 A | 7/2000 | Edwards, Jr. |
| 6,097,419 A | 8/2000 | Morris et al. |
| 6,113,137 A | 9/2000 | Mizutani et al. |
| 6,118,230 A | 9/2000 | Fleischmann |
| 6,150,774 A | 11/2000 | Mueller et al. |
| 6,151,529 A | 11/2000 | Batko |
| 6,160,359 A | 12/2000 | Fleischmann |
| 6,166,496 A | 12/2000 | Lys et al. |
| 6,211,626 B1 | 4/2001 | Lys et al. |
| 6,257,735 B1 | 7/2001 | Baar |
| D447,266 S | 8/2001 | Verfuerth |
| 6,292,901 B1 | 9/2001 | Lys et al. |
| 6,340,868 B1 | 1/2002 | Lys et al. |
| 6,359,555 B1 | 3/2002 | Williams |
| 6,370,489 B1 | 4/2002 | Williams et al. |
| D457,667 S | 5/2002 | Piepgras et al. |
| D457,669 S | 5/2002 | Piepgras et al. |
| D457,974 S | 5/2002 | Piepgras et al. |
| 6,384,722 B1 | 5/2002 | Williams |
| 6,388,399 B1 | 5/2002 | Eckel et al. |
| 6,393,381 B1 | 5/2002 | Williams et al. |
| D458,395 S | 6/2002 | Piepgras et al. |
| D460,735 S | 7/2002 | Verfuerth |
| 6,415,205 B1 | 7/2002 | Myron et al. |
| 6,415,245 B2 | 7/2002 | Williams et al. |
| 6,428,183 B1 | 8/2002 | McAlpin |
| D463,059 S | 9/2002 | Verfuerth |
| D463,610 S | 9/2002 | Piepgras et al. |
| 6,452,339 B1 | 9/2002 | Morrissey et al. |
| 6,452,340 B1 | 9/2002 | Morrissey, Jr. et al. |
| 6,456,960 B1 | 9/2002 | Williams et al. |
| 6,459,919 B1 | 10/2002 | Lys et al. |
| 6,466,190 B1 | 10/2002 | Evoy |
| 6,467,933 B2 | 10/2002 | Baar |
| 6,486,790 B1 | 11/2002 | Perlo et al. |
| D468,035 S | 12/2002 | Blanc et al. |
| 6,491,412 B1 | 12/2002 | Bowman et al. |
| 6,517,218 B2 | 2/2003 | Hochstein |
| 6,528,954 B1 | 3/2003 | Lys et al. |
| 6,548,967 B1 | 4/2003 | Dowling et al. |
| 6,577,080 B2 | 6/2003 | Lys et al. |
| 6,585,396 B1 | 7/2003 | Verfuerth |
| 6,604,062 B2 | 8/2003 | Williams et al. |
| 6,608,453 B2 | 8/2003 | Morgan et al. |
| D479,826 S | 9/2003 | Verfuerth et al. |
| 6,624,597 B2 | 9/2003 | Dowling et al. |
| 6,641,284 B2 | 11/2003 | Stopa et al. |
| 6,652,119 B1 | 11/2003 | Barton |
| D483,332 S | 12/2003 | Verfuerth |
| 6,710,588 B1 | 3/2004 | Verfuerth et al. |
| 6,714,895 B2 | 3/2004 | Williams et al. |
| 6,717,376 B2 | 4/2004 | Lys et al. |
| 6,720,745 B2 | 4/2004 | Lys et al. |
| 6,724,180 B1 | 4/2004 | Verfuerth et al. |
| D491,678 S | 6/2004 | Piepgras |
| D492,042 S | 6/2004 | Piepgras |
| 6,746,274 B1 | 6/2004 | Verfuerth |
| 6,748,299 B1 | 6/2004 | Motoyama |
| 6,758,580 B1 | 7/2004 | Verfuerth |
| D494,700 S | 8/2004 | Hartman et al. |
| 6,774,584 B2 | 8/2004 | Lys et al. |
| 6,774,619 B1 | 8/2004 | Verfuerth et al. |
| 6,777,891 B2 | 8/2004 | Lys et al. |
| 6,781,329 B2 | 8/2004 | Mueller et al. |
| 6,788,011 B2 | 9/2004 | Mueller et al. |
| 6,791,458 B2 | 9/2004 | Baldwin |
| 6,798,341 B1 | 9/2004 | Eckel et al. |
| 6,801,003 B2 | 10/2004 | Schanberger et al. |
| 6,806,659 B1 | 10/2004 | Mueller et al. |
| 6,807,516 B2 | 10/2004 | Williams et al. |
| 6,841,944 B2 | 1/2005 | Morrissey et al. |
| 6,869,204 B2 | 3/2005 | Morgan et al. |
| 6,883,929 B2 | 4/2005 | Dowling |
| 6,888,322 B2 | 5/2005 | Dowling et al. |
| 6,892,168 B2 | 5/2005 | Williams et al. |
| 6,909,921 B1 | 6/2005 | Bilger |
| 6,933,627 B2 | 8/2005 | Wilhelm |
| 6,936,978 B2 | 8/2005 | Morgan et al. |
| 6,964,502 B1 | 11/2005 | Verfuerth |
| 6,965,205 B2 | 11/2005 | Piepgras et al. |
| 6,967,448 B2 | 11/2005 | Morgan et al. |
| 6,969,954 B2 | 11/2005 | Lys |
| 6,975,079 B2 | 12/2005 | Lys et al. |
| 7,002,546 B1 | 2/2006 | Stuppi et al. |
| D518,218 S | 3/2006 | Roberge et al. |
| 7,014,336 B1 | 3/2006 | Ducharme et al. |
| 7,019,276 B2 | 3/2006 | Cloutier et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,042,172 B2 | 5/2006 | Dowling et al. |
| 7,062,360 B2 | 6/2006 | Fairlie et al. |
| 7,064,498 B2 | 6/2006 | Dowling et al. |
| 7,093,952 B2 | 8/2006 | Ono et al. |
| 7,113,541 B1 | 9/2006 | Lys et al. |
| 7,132,635 B2 | 11/2006 | Dowling |
| 7,132,785 B2 | 11/2006 | Ducharme |
| 7,132,804 B2 | 11/2006 | Lys et al. |
| 7,135,824 B2 | 11/2006 | Lys et al. |
| 7,139,617 B1 | 11/2006 | Morgan et al. |
| 7,160,140 B1 | 1/2007 | Mrakovich et al. |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,178,941 B2 | 2/2007 | Roberge et al. |
| 7,180,252 B2 | 2/2007 | Lys et al. |
| D538,462 S | 3/2007 | Verfuerth et al. |
| 7,186,003 B2 | 3/2007 | Dowling et al. |
| 7,187,141 B2 | 3/2007 | Mueller et al. |
| 7,190,121 B2 | 3/2007 | Rose et al. |
| 7,199,531 B2 | 4/2007 | Loughrey |
| 7,202,613 B2 | 4/2007 | Morgan et al. |
| 7,204,622 B2 | 4/2007 | Dowling et al. |
| 7,220,015 B2 | 5/2007 | Dowling |
| 7,220,018 B2 | 5/2007 | Crabb et al. |
| 7,221,104 B2 | 5/2007 | Lys et al. |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |

(56) References Cited

U.S. PATENT DOCUMENTS

| | | |
|---|---|---|
| 7,236,366 B2 | 6/2007 | Chen |
| 7,242,152 B2 | 7/2007 | Dowling et al. |
| 7,248,239 B2 | 7/2007 | Dowling et al. |
| D548,868 S | 8/2007 | Roberge et al. |
| 7,253,566 B2 | 8/2007 | Lys et al. |
| 7,255,457 B2 | 8/2007 | Ducharme et al. |
| 7,256,554 B2 | 8/2007 | Lys |
| 7,256,556 B2 | 8/2007 | Lane et al. |
| 7,274,160 B2 | 9/2007 | Mueller et al. |
| 7,274,975 B2 | 9/2007 | Miller |
| 7,300,192 B2 | 11/2007 | Mueller et al. |
| D557,817 S | 12/2007 | Verfuerth |
| 7,303,300 B2 | 12/2007 | Dowling et al. |
| 7,308,296 B2 | 12/2007 | Lys et al. |
| 7,309,965 B2 | 12/2007 | Dowling et al. |
| 7,311,423 B2 | 12/2007 | Frecska et al. |
| D560,469 S | 1/2008 | Bartol et al. |
| D562,494 S | 2/2008 | Piepgras Colin |
| 7,333,903 B2 | 2/2008 | Walters et al. |
| 7,344,279 B2 | 3/2008 | Mueller et al. |
| 7,344,296 B2 | 3/2008 | Matsui et al. |
| 7,348,736 B2 | 3/2008 | Piepgras et al. |
| D566,323 S | 4/2008 | Piepgras et al. |
| 7,350,936 B2 | 4/2008 | Ducharme et al. |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,354,172 B2 | 4/2008 | Chemel et al. |
| 7,358,679 B2 | 4/2008 | Lys et al. |
| 7,358,929 B2 | 4/2008 | Mueller et al. |
| 7,385,359 B2 | 6/2008 | Dowling et al. |
| 7,387,405 B2 | 6/2008 | Ducharme et al. |
| 7,391,335 B2 | 6/2008 | Mubaslat et al. |
| 7,401,942 B1 | 7/2008 | Verfuerth et al. |
| 7,411,489 B1 | 8/2008 | Elwell et al. |
| 7,427,840 B2 | 9/2008 | Morgan et al. |
| 7,445,354 B2 | 11/2008 | Aoki et al. |
| 7,453,217 B2 | 11/2008 | Lys et al. |
| 7,470,055 B2 | 12/2008 | Hacker et al. |
| 7,482,565 B2 | 1/2009 | Morgan et al. |
| 7,482,764 B2 | 1/2009 | Morgan et al. |
| 7,495,671 B2 | 2/2009 | Chemel et al. |
| 7,501,768 B2 | 3/2009 | Lane et al. |
| 7,502,034 B2 | 3/2009 | Chemel et al. |
| 7,506,993 B2 | 3/2009 | Kain et al. |
| 7,507,001 B2 | 3/2009 | Kit |
| 7,518,319 B2 | 4/2009 | Konno et al. |
| 7,520,634 B2 | 4/2009 | Ducharme et al. |
| D592,786 S | 5/2009 | Bisberg et al. |
| 7,529,594 B2 | 5/2009 | Walters et al. |
| D593,697 S | 6/2009 | Liu et al. |
| 7,543,956 B2 | 6/2009 | Piepgras et al. |
| 7,546,167 B2 | 6/2009 | Walters et al. |
| 7,546,168 B2 | 6/2009 | Walters et al. |
| 7,550,931 B2 | 6/2009 | Lys et al. |
| 7,550,935 B2 | 6/2009 | Lys et al. |
| D595,894 S | 7/2009 | Verfuerth et al. |
| 7,563,006 B1 | 7/2009 | Verfuerth et al. |
| 7,571,063 B2 | 8/2009 | Howell et al. |
| 7,572,028 B2 | 8/2009 | Mueller et al. |
| 7,575,338 B1 | 8/2009 | Verfuerth |
| 7,598,681 B2 | 10/2009 | Lys et al. |
| 7,598,684 B2 | 10/2009 | Lys et al. |
| 7,598,686 B2 | 10/2009 | Lys et al. |
| 7,603,184 B2 | 10/2009 | Walters et al. |
| 7,619,370 B2 | 11/2009 | Chemel et al. |
| D606,697 S | 12/2009 | Verfuerth et al. |
| D606,698 S | 12/2009 | Verfuerth et al. |
| 7,628,506 B2 | 12/2009 | Verfuerth et al. |
| 7,638,743 B2 | 12/2009 | Bartol et al. |
| 7,642,730 B2 | 1/2010 | Dowling et al. |
| 7,646,029 B2 | 1/2010 | Mueller et al. |
| 7,659,674 B2 | 2/2010 | Mueller et al. |
| 7,660,892 B2 | 2/2010 | Choong et al. |
| 7,703,951 B2 | 4/2010 | Piepgras et al. |
| D617,028 S | 6/2010 | Verfuerth et al. |
| D617,029 S | 6/2010 | Verfuerth et al. |
| 7,744,251 B2 | 6/2010 | Liu et al. |
| 7,746,003 B2 | 6/2010 | Verfuerth et al. |
| 7,753,568 B2 | 7/2010 | Hu et al. |
| 7,761,260 B2 | 7/2010 | Walters et al. |
| 7,762,861 B2 | 7/2010 | Verfuerth et al. |
| D621,410 S | 8/2010 | Verfuerth et al. |
| D621,411 S | 8/2010 | Verfuerth et al. |
| 7,766,518 B2 | 8/2010 | Piepgras et al. |
| 7,777,427 B2 | 8/2010 | Stalker, III |
| 7,780,310 B2 | 8/2010 | Verfuerth et al. |
| 7,783,390 B2 | 8/2010 | Miller |
| 7,784,966 B2 | 8/2010 | Verfuerth et al. |
| D623,340 S | 9/2010 | Verfuerth et al. |
| 7,792,956 B2 | 9/2010 | Choong et al. |
| 7,809,448 B2 | 10/2010 | Lys et al. |
| 7,824,065 B2 | 11/2010 | Maxik |
| 7,828,465 B2 | 11/2010 | Roberge et al. |
| 7,839,017 B2 | 11/2010 | Huizenga et al. |
| 7,839,295 B2 | 11/2010 | Ries, II |
| 7,845,823 B2 | 12/2010 | Mueller et al. |
| 7,852,017 B1 | 12/2010 | Melanson |
| 7,866,847 B2 | 1/2011 | Zheng |
| D632,006 S | 2/2011 | Verfuerth et al. |
| D632,418 S | 2/2011 | Bisberg et al. |
| 7,878,683 B2 | 2/2011 | Logan et al. |
| 7,911,359 B2 | 3/2011 | Walters et al. |
| 7,924,155 B2 | 4/2011 | Soccoli et al. |
| 7,925,384 B2 | 4/2011 | Huizenga et al. |
| 7,926,974 B2 | 4/2011 | Wung et al. |
| 7,936,561 B1 | 5/2011 | Lin |
| 7,938,558 B2 | 5/2011 | Wilcox et al. |
| 7,959,320 B2 | 6/2011 | Mueller et al. |
| 7,962,606 B2 | 6/2011 | Barron et al. |
| 7,976,188 B2 | 7/2011 | Peng |
| 7,988,335 B2 | 8/2011 | Liu et al. |
| 7,988,341 B2 | 8/2011 | Chen |
| 7,997,762 B2 | 8/2011 | Wang et al. |
| 8,010,319 B2 | 8/2011 | Walters et al. |
| 8,013,281 B2 | 9/2011 | Morgan et al. |
| 8,025,426 B2 | 9/2011 | Mundle et al. |
| 8,033,686 B2 | 10/2011 | Recker et al. |
| 8,035,320 B2 | 10/2011 | Sibert |
| 8,042,968 B2 | 10/2011 | Boyer et al. |
| 8,052,301 B2 | 11/2011 | Zhou et al. |
| 8,061,865 B2 | 11/2011 | Piepgras et al. |
| 8,066,403 B2 | 11/2011 | Sanfilippo et al. |
| 8,067,906 B2 | 11/2011 | Null |
| D650,225 S | 12/2011 | Bartol et al. |
| 8,070,312 B2 | 12/2011 | Verfuerth et al. |
| 8,079,731 B2 | 12/2011 | Lynch et al. |
| 8,080,819 B2 | 12/2011 | Mueller et al. |
| 8,096,679 B2 | 1/2012 | Chen et al. |
| 8,101,434 B2 | 1/2012 | Guillien et al. |
| 8,136,958 B2 | 3/2012 | Verfuerth et al. |
| 8,138,690 B2 | 3/2012 | Chemel et al. |
| 8,147,267 B2 | 4/2012 | Oster |
| RE43,456 E | 6/2012 | Verfuerth et al. |
| 8,214,061 B2 | 7/2012 | Westrick, Jr. et al. |
| 8,232,745 B2 | 7/2012 | Chemel et al. |
| 8,237,581 B2 | 8/2012 | Ries, II |
| 8,237,582 B2 | 8/2012 | Ries, II |
| 8,242,927 B2 | 8/2012 | Ries, II |
| 8,260,575 B2 | 9/2012 | Walters et al. |
| 8,265,674 B2 | 9/2012 | Choong et al. |
| 8,275,471 B2 | 9/2012 | Huizenga et al. |
| 8,337,043 B2 | 12/2012 | Verfuerth et al. |
| 8,339,069 B2 | 12/2012 | Chemel et al. |
| 8,344,660 B2 | 1/2013 | Mohan et al. |
| 8,344,665 B2 | 1/2013 | Verfuerth et al. |
| 8,364,325 B2 | 1/2013 | Huizenga et al. |
| 8,368,321 B2 | 2/2013 | Chemel et al. |
| 8,370,483 B2 | 2/2013 | Choong et al. |
| 8,373,362 B2 | 2/2013 | Chemel et al. |
| 8,376,583 B2 | 2/2013 | Wang et al. |
| 8,376,600 B2 | 2/2013 | Bartol et al. |
| 8,406,937 B2 | 3/2013 | Verfuerth et al. |
| 8,415,897 B2 | 4/2013 | Choong et al. |

(56) References Cited

U.S. PATENT DOCUMENTS

| | | |
|---|---|---|
| 8,422,401 B1 | 4/2013 | Choong et al. |
| 8,445,826 B2 | 5/2013 | Verfuerth |
| 8,450,670 B2 | 5/2013 | Verfuerth et al. |
| 8,466,626 B2 | 6/2013 | Null et al. |
| 8,476,565 B2 | 7/2013 | Verfuerth |
| 8,531,134 B2 | 9/2013 | Chemel et al. |
| 8,536,802 B2 | 9/2013 | Chemel et al. |
| 8,543,249 B2 | 9/2013 | Chemel et al. |
| 8,552,664 B2 | 10/2013 | Chemel et al. |
| 8,586,902 B2 | 11/2013 | Verfuerth |
| 8,593,135 B2 | 11/2013 | Chemel et al. |
| 8,604,701 B2 | 12/2013 | Verfuerth et al. |
| 8,610,376 B2 | 12/2013 | Chemel et al. |
| 8,610,377 B2 | 12/2013 | Chemel et al. |
| 8,729,833 B2 | 5/2014 | Chemel et al. |
| 8,754,589 B2 | 6/2014 | Chemel et al. |
| 8,755,039 B2 | 6/2014 | Ramer et al. |
| 8,805,550 B2 | 8/2014 | Chemel et al. |
| 8,823,277 B2 | 9/2014 | Chemel et al. |
| 8,841,859 B2 | 9/2014 | Chemel et al. |
| 8,866,408 B2 | 10/2014 | Chemel et al. |
| 8,954,170 B2 | 2/2015 | Chemel et al. |
| 9,014,829 B2 | 4/2015 | Chemel et al. |
| 9,072,133 B2 | 6/2015 | Chemel et al. |
| 9,125,254 B2 | 9/2015 | Chemel et al. |
| 9,241,392 B2 | 1/2016 | Chemel et al. |
| 9,519,426 B2 | 11/2016 | Chemel et al. |
| 2001/0028227 A1 | 10/2001 | Lys et al. |
| 2001/0055965 A1 | 12/2001 | Delp et al. |
| 2002/0032535 A1 | 3/2002 | Alexander et al. |
| 2002/0036430 A1 | 3/2002 | Welches et al. |
| 2002/0038157 A1 | 3/2002 | Dowling et al. |
| 2002/0047628 A1 | 4/2002 | Morgan et al. |
| 2002/0048169 A1 | 4/2002 | Dowling et al. |
| 2002/0070688 A1 | 6/2002 | Dowling et al. |
| 2002/0074559 A1 | 6/2002 | Dowling et al. |
| 2002/0078221 A1 | 6/2002 | Blackwell et al. |
| 2002/0101197 A1 | 8/2002 | Lys et al. |
| 2002/0113555 A1 | 8/2002 | Lys et al. |
| 2002/0130627 A1 | 9/2002 | Morgan et al. |
| 2002/0133270 A1 | 9/2002 | Hung et al. |
| 2002/0134849 A1 | 9/2002 | Disser |
| 2002/0145394 A1 | 10/2002 | Morgan et al. |
| 2002/0152045 A1 | 10/2002 | Dowling et al. |
| 2002/0153851 A1 | 10/2002 | Morgan et al. |
| 2002/0163316 A1 | 11/2002 | Lys et al. |
| 2002/0171365 A1 | 11/2002 | Morgan et al. |
| 2002/0171377 A1 | 11/2002 | Mueller et al. |
| 2002/0171378 A1 | 11/2002 | Morgan et al. |
| 2002/0175642 A1 | 11/2002 | von Kannewurff et al. |
| 2003/0011538 A1 | 1/2003 | Lys et al. |
| 2003/0057886 A1 | 3/2003 | Lys et al. |
| 2003/0057887 A1 | 3/2003 | Dowling et al. |
| 2003/0057888 A1 | 3/2003 | Archenhold et al. |
| 2003/0057890 A1 | 3/2003 | Lys et al. |
| 2003/0063462 A1 | 4/2003 | Shimizu et al. |
| 2003/0076056 A1 | 4/2003 | Schuurmans |
| 2003/0076281 A1 | 4/2003 | Morgan et al. |
| 2003/0097309 A1 | 5/2003 | Gibler et al. |
| 2003/0100837 A1 | 5/2003 | Lys et al. |
| 2003/0100998 A2 | 5/2003 | Brunner et al. |
| 2003/0102675 A1 | 6/2003 | Noethlichs |
| 2003/0123705 A1 | 7/2003 | Stam et al. |
| 2003/0123706 A1 | 7/2003 | Stam et al. |
| 2003/0133292 A1 | 7/2003 | Mueller et al. |
| 2003/0137258 A1 | 7/2003 | Piepgras et al. |
| 2003/0206411 A9 | 11/2003 | Dowling et al. |
| 2003/0214259 A9 | 11/2003 | Dowling et al. |
| 2003/0216971 A1 | 11/2003 | Sick et al. |
| 2003/0222587 A1 | 12/2003 | Dowling et al. |
| 2003/0222603 A1 | 12/2003 | Mogilner et al. |
| 2004/0002792 A1 | 1/2004 | Hoffknecht |
| 2004/0036006 A1 | 2/2004 | Dowling |
| 2004/0052076 A1 | 3/2004 | Mueller et al. |
| 2004/0090191 A1 | 5/2004 | Mueller et al. |
| 2004/0090787 A1 | 5/2004 | Dowling et al. |
| 2004/0105261 A1 | 6/2004 | Ducharme et al. |
| 2004/0105264 A1 | 6/2004 | Spero |
| 2004/0111638 A1 | 6/2004 | Yadav et al. |
| 2004/0113044 A1 | 6/2004 | Ishiguchi |
| 2004/0113568 A1 | 6/2004 | Dowling et al. |
| 2004/0119415 A1 | 6/2004 | Lansing et al. |
| 2004/0130909 A1 | 7/2004 | Mueller et al. |
| 2004/0141321 A1 | 7/2004 | Dowling et al. |
| 2004/0155609 A1 | 8/2004 | Lys et al. |
| 2004/0160199 A1 | 8/2004 | Morgan et al. |
| 2004/0178751 A1 | 9/2004 | Mueller et al. |
| 2004/0212320 A1 | 10/2004 | Dowling et al. |
| 2004/0212321 A1 | 10/2004 | Lys et al. |
| 2004/0212993 A1 | 10/2004 | Morgan et al. |
| 2004/0240890 A1 | 12/2004 | Lys et al. |
| 2004/0252501 A1 | 12/2004 | Moriyama et al. |
| 2004/0257007 A1 | 12/2004 | Lys et al. |
| 2005/0030744 A1 | 2/2005 | Ducharme et al. |
| 2005/0035728 A1 | 2/2005 | Schanberger et al. |
| 2005/0036300 A1 | 2/2005 | Dowling et al. |
| 2005/0040774 A1 | 2/2005 | Mueller et al. |
| 2005/0041161 A1 | 2/2005 | Dowling et al. |
| 2005/0041424 A1 | 2/2005 | Ducharme |
| 2005/0044617 A1 | 3/2005 | Mueller et al. |
| 2005/0047132 A1 | 3/2005 | Dowling et al. |
| 2005/0047134 A1 | 3/2005 | Mueller et al. |
| 2005/0062440 A1 | 3/2005 | Lys et al. |
| 2005/0063194 A1 | 3/2005 | Lys et al. |
| 2005/0099796 A1 | 5/2005 | Magee |
| 2005/0099824 A1 | 5/2005 | Dowling et al. |
| 2005/0116667 A1 | 6/2005 | Mueller et al. |
| 2005/0125083 A1 | 6/2005 | Kiko |
| 2005/0128751 A1 | 6/2005 | Roberge et al. |
| 2005/0151489 A1 | 7/2005 | Lys et al. |
| 2005/0162101 A1 | 7/2005 | Leong et al. |
| 2005/0174473 A1 | 8/2005 | Morgan et al. |
| 2005/0213352 A1 | 9/2005 | Lys |
| 2005/0213353 A1 | 9/2005 | Lys |
| 2005/0218838 A1 | 10/2005 | Lys |
| 2005/0218870 A1 | 10/2005 | Lys |
| 2005/0219872 A1 | 10/2005 | Lys |
| 2005/0231133 A1 | 10/2005 | Lys |
| 2005/0236029 A1 | 10/2005 | Dowling |
| 2005/0236998 A1 | 10/2005 | Mueller et al. |
| 2005/0248299 A1 | 11/2005 | Chemel et al. |
| 2005/0253533 A1 | 11/2005 | Lys et al. |
| 2005/0258765 A1 | 11/2005 | Rodriguez et al. |
| 2005/0275626 A1 | 12/2005 | Mueller et al. |
| 2005/0276053 A1 | 12/2005 | Nortrup et al. |
| 2005/0285547 A1 | 12/2005 | Piepgras et al. |
| 2006/0002110 A1 | 1/2006 | Dowling et al. |
| 2006/0012987 A9 | 1/2006 | Ducharme et al. |
| 2006/0022214 A1 | 2/2006 | Morgan et al. |
| 2006/0038511 A1 | 2/2006 | Tagawa |
| 2006/0050509 A9 | 3/2006 | Dowling et al. |
| 2006/0076908 A1 | 4/2006 | Morgan et al. |
| 2006/0087843 A1 | 4/2006 | Setomoto et al. |
| 2006/0098077 A1 | 5/2006 | Dowling |
| 2006/0104058 A1 | 5/2006 | Chemel et al. |
| 2006/0106762 A1 | 5/2006 | Caracas et al. |
| 2006/0108935 A1 | 5/2006 | Stevn |
| 2006/0109649 A1 | 5/2006 | Ducharme et al. |
| 2006/0125426 A1 | 6/2006 | Veskovic et al. |
| 2006/0132061 A1 | 6/2006 | McCormick et al. |
| 2006/0146531 A1 | 7/2006 | Reo et al. |
| 2006/0152172 A9 | 7/2006 | Mueller et al. |
| 2006/0158881 A1 | 7/2006 | Dowling |
| 2006/0160199 A1 | 7/2006 | DiCosimo et al. |
| 2006/0170376 A1 | 8/2006 | Piepgras et al. |
| 2006/0181878 A1 | 8/2006 | Burkholder |
| 2006/0198128 A1 | 9/2006 | Piepgras et al. |
| 2006/0208667 A1 | 9/2006 | Lys et al. |
| 2006/0221606 A1 | 10/2006 | Dowling |
| 2006/0245174 A1 | 11/2006 | Ashdown et al. |
| 2006/0262516 A9 | 11/2006 | Dowling et al. |
| 2006/0262521 A1 | 11/2006 | Piepgras et al. |
| 2006/0262544 A1 | 11/2006 | Piepgras et al. |
| 2006/0262545 A1 | 11/2006 | Piepgras et al. |

(56) References Cited

U.S. PATENT DOCUMENTS

| | | |
|---|---|---|
| 2006/0273741 A1 | 12/2006 | Stalker |
| 2006/0276938 A1 | 12/2006 | Miller |
| 2006/0285325 A1 | 12/2006 | Ducharme et al. |
| 2007/0021946 A1 | 1/2007 | Williams et al. |
| 2007/0030716 A1 | 2/2007 | Manolescu |
| 2007/0032990 A1 | 2/2007 | Williams et al. |
| 2007/0040513 A1 | 2/2007 | Cleland et al. |
| 2007/0045407 A1 | 3/2007 | Paul |
| 2007/0047227 A1 | 3/2007 | Ducharme |
| 2007/0064425 A1 | 3/2007 | Frecska et al. |
| 2007/0086754 A1 | 4/2007 | Lys et al. |
| 2007/0086912 A1 | 4/2007 | Dowling et al. |
| 2007/0115658 A1 | 5/2007 | Mueller et al. |
| 2007/0115665 A1 | 5/2007 | Mueller et al. |
| 2007/0143046 A1 | 6/2007 | Budike, Jr. |
| 2007/0145915 A1 | 6/2007 | Roberge et al. |
| 2007/0152797 A1 | 7/2007 | Chemel et al. |
| 2007/0153514 A1 | 7/2007 | Dowling et al. |
| 2007/0188114 A1 | 8/2007 | Lys et al. |
| 2007/0188427 A1 | 8/2007 | Lys et al. |
| 2007/0189026 A1 | 8/2007 | Chemel et al. |
| 2007/0195526 A1 | 8/2007 | Dowling et al. |
| 2007/0206375 A1 | 9/2007 | Piepgras et al. |
| 2007/0211463 A1 | 9/2007 | Chevalier et al. |
| 2007/0217196 A1 | 9/2007 | Shaner |
| 2007/0228999 A1 | 10/2007 | Kit |
| 2007/0229250 A1 | 10/2007 | Recker et al. |
| 2007/0236156 A1 | 10/2007 | Lys et al. |
| 2007/0237284 A1 | 10/2007 | Lys et al. |
| 2007/0258231 A1 | 11/2007 | Koerner et al. |
| 2007/0258240 A1 | 11/2007 | Ducharme et al. |
| 2007/0263379 A1 | 11/2007 | Dowling |
| 2007/0267978 A1 | 11/2007 | Shteynberg et al. |
| 2007/0273307 A1 | 11/2007 | Westrick et al. |
| 2007/0291483 A1 | 12/2007 | Lys |
| 2008/0001071 A1 | 1/2008 | Lee et al. |
| 2008/0007943 A1 | 1/2008 | Verfuerth et al. |
| 2008/0007944 A1 | 1/2008 | Verfuerth et al. |
| 2008/0012502 A1 | 1/2008 | Lys |
| 2008/0012506 A1 | 1/2008 | Mueller et al. |
| 2008/0030149 A1 | 2/2008 | Callahan |
| 2008/0074059 A1 | 3/2008 | Ahmed |
| 2008/0079568 A1 | 4/2008 | Primous et al. |
| 2008/0089060 A1 | 4/2008 | Kondo et al. |
| 2008/0140231 A1 | 6/2008 | Blackwell et al. |
| 2008/0158878 A1 | 7/2008 | Van Laanen et al. |
| 2008/0164826 A1 | 7/2008 | Lys |
| 2008/0164827 A1 | 7/2008 | Lys |
| 2008/0164854 A1 | 7/2008 | Lys |
| 2008/0170371 A1 | 7/2008 | Lai |
| 2008/0180015 A1 | 7/2008 | Wu et al. |
| 2008/0183081 A1 | 7/2008 | Lys et al. |
| 2008/0183307 A1 | 7/2008 | Clayton et al. |
| 2008/0183316 A1 | 7/2008 | Clayton |
| 2008/0195561 A1 | 8/2008 | Herzig |
| 2008/0204268 A1 | 8/2008 | Dowling et al. |
| 2008/0208651 A1 | 8/2008 | Johnston et al. |
| 2008/0215391 A1 | 9/2008 | Dowling et al. |
| 2008/0246415 A1 | 10/2008 | Chitta et al. |
| 2008/0265799 A1 | 10/2008 | Sibert |
| 2008/0272934 A1 | 11/2008 | Wang et al. |
| 2008/0275802 A1 | 11/2008 | Verfuerth et al. |
| 2008/0278941 A1 | 11/2008 | Logan et al. |
| 2008/0310850 A1 | 12/2008 | Pederson et al. |
| 2009/0000217 A1 | 1/2009 | Verfuerth et al. |
| 2009/0009989 A1 | 1/2009 | Verfuerth et al. |
| 2009/0014625 A1 | 1/2009 | Bartol et al. |
| 2009/0018673 A1 | 1/2009 | Dushane et al. |
| 2009/0021955 A1 | 1/2009 | Kuang et al. |
| 2009/0027932 A1 | 1/2009 | Haines et al. |
| 2009/0034263 A1 | 2/2009 | Stenback et al. |
| 2009/0050908 A1 | 2/2009 | Yuan et al. |
| 2009/0051506 A1 | 2/2009 | Hicksted et al. |
| 2009/0059603 A1 | 3/2009 | Recker et al. |
| 2009/0059915 A1 | 3/2009 | Baker |
| 2009/0066266 A1 | 3/2009 | Jungwirth et al. |
| 2009/0076790 A1 | 3/2009 | Fein et al. |
| 2009/0085494 A1 | 4/2009 | Summerland |
| 2009/0085500 A1 | 4/2009 | Zampini et al. |
| 2009/0122571 A1 | 5/2009 | Simmons et al. |
| 2009/0147507 A1 | 6/2009 | Verfuerth et al. |
| 2009/0160364 A1 | 6/2009 | Ackermann et al. |
| 2009/0189535 A1 | 7/2009 | Verfuerth et al. |
| 2009/0193217 A1 | 7/2009 | Korecki et al. |
| 2009/0243517 A1 | 10/2009 | Verfuerth et al. |
| 2009/0248217 A1 | 10/2009 | Verfuerth et al. |
| 2009/0267540 A1 | 10/2009 | Chemel et al. |
| 2009/0278472 A1 | 11/2009 | Mills et al. |
| 2009/0278479 A1 | 11/2009 | Platner et al. |
| 2009/0284184 A1 | 11/2009 | Valois et al. |
| 2009/0299527 A1 | 12/2009 | Huizenga et al. |
| 2009/0299811 A1 | 12/2009 | Verfuerth et al. |
| 2009/0303722 A1 | 12/2009 | Verfuerth et al. |
| 2009/0315485 A1 | 12/2009 | Verfuerth et al. |
| 2009/0323347 A1 | 12/2009 | Zhang et al. |
| 2010/0026479 A1 | 2/2010 | Tran |
| 2010/0034386 A1 | 2/2010 | Choong et al. |
| 2010/0052574 A1 | 3/2010 | Blakeley |
| 2010/0061088 A1 | 3/2010 | Bartol et al. |
| 2010/0109536 A1 | 5/2010 | Jung et al. |
| 2010/0124376 A1* | 5/2010 | Thind ............... G06K 9/00369 382/224 |
| 2010/0127634 A1 | 5/2010 | Dowling et al. |
| 2010/0134051 A1 | 6/2010 | Huizenga et al. |
| 2010/0135186 A1 | 6/2010 | Choong et al. |
| 2010/0148689 A1 | 6/2010 | Morgan et al. |
| 2010/0169249 A1 | 7/2010 | Jhala et al. |
| 2010/0171145 A1 | 7/2010 | Morgan et al. |
| 2010/0171442 A1 | 7/2010 | Draper et al. |
| 2010/0185339 A1 | 7/2010 | Huizenga et al. |
| 2010/0201267 A1 | 8/2010 | Bourquin et al. |
| 2010/0204841 A1 | 8/2010 | Chemel et al. |
| 2010/0207534 A1 | 8/2010 | Dowling et al. |
| 2010/0211443 A1 | 8/2010 | Carrel et al. |
| 2010/0246168 A1 | 9/2010 | Verfuerth et al. |
| 2010/0246172 A1 | 9/2010 | Liu |
| 2010/0253499 A1 | 10/2010 | Haab et al. |
| 2010/0259931 A1 | 10/2010 | Chemel et al. |
| 2010/0262313 A1 | 10/2010 | Chambers et al. |
| 2010/0264834 A1 | 10/2010 | Gaines et al. |
| 2010/0264846 A1 | 10/2010 | Chemel et al. |
| 2010/0270933 A1 | 10/2010 | Chemel et al. |
| 2010/0283605 A1 | 11/2010 | Nevins |
| 2010/0295473 A1 | 11/2010 | Chemel et al. |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0296285 A1 | 11/2010 | Chemel et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301773 A1 | 12/2010 | Chemel et al. |
| 2010/0301774 A1 | 12/2010 | Chemel et al. |
| 2010/0301834 A1 | 12/2010 | Chemel et al. |
| 2010/0302779 A1 | 12/2010 | Chemel et al. |
| 2010/0307075 A1 | 12/2010 | Zampini et al. |
| 2010/0308736 A1 | 12/2010 | Hung et al. |
| 2010/0327766 A1 | 12/2010 | Recker et al. |
| 2011/0001436 A1 | 1/2011 | Chemel et al. |
| 2011/0001438 A1 | 1/2011 | Chemel et al. |
| 2011/0033632 A1 | 2/2011 | Vance et al. |
| 2011/0035404 A1 | 2/2011 | Morgan et al. |
| 2011/0038148 A1 | 2/2011 | Pyle |
| 2011/0043124 A1 | 2/2011 | Johnston et al. |
| 2011/0057581 A1 | 3/2011 | Ashar et al. |
| 2011/0060701 A1 | 3/2011 | Verfuerth et al. |
| 2011/0068702 A1 | 3/2011 | Van De Ven et al. |
| 2011/0084608 A1 | 4/2011 | Lin et al. |
| 2011/0090684 A1 | 4/2011 | Logan et al. |
| 2011/0102052 A1 | 5/2011 | Billingsley et al. |
| 2011/0118890 A1 | 5/2011 | Parsons |
| 2011/0133655 A1 | 6/2011 | Recker et al. |
| 2011/0140611 A1 | 6/2011 | Elek et al. |

(56) References Cited

U.S. PATENT DOCUMENTS

| | | |
|---|---|---|
| 2011/0140612 A1 | 6/2011 | Mohan et al. |
| 2011/0146669 A1 | 6/2011 | Bartol et al. |
| 2011/0172844 A1 | 7/2011 | Choong et al. |
| 2011/0198977 A1 | 8/2011 | VanderSluis |
| 2011/0204820 A1 | 8/2011 | Tikkanen et al. |
| 2011/0215736 A1 | 9/2011 | Horbst et al. |
| 2011/0216538 A1 | 9/2011 | Logan et al. |
| 2011/0235317 A1 | 9/2011 | Verfuerth et al. |
| 2011/0248171 A1 | 10/2011 | Rueger et al. |
| 2011/0254466 A1 | 10/2011 | Jackson et al. |
| 2011/0279063 A1 | 11/2011 | Wang et al. |
| 2011/0279248 A1 | 11/2011 | Ogawa |
| 2012/0007511 A1 | 1/2012 | Choong et al. |
| 2012/0032599 A1 | 2/2012 | Mohan et al. |
| 2012/0037725 A1 | 2/2012 | Verfuerth |
| 2012/0038281 A1 | 2/2012 | Verfuerth |
| 2012/0038490 A1 | 2/2012 | Verfuerth |
| 2012/0040606 A1 | 2/2012 | Verfuerth |
| 2012/0044350 A1 | 2/2012 | Verfuerth |
| 2012/0044670 A1 | 2/2012 | Piepgras et al. |
| 2012/0058663 A1 | 3/2012 | Oster |
| 2012/0062125 A1 | 3/2012 | Mohan et al. |
| 2012/0080944 A1 | 4/2012 | Recker et al. |
| 2012/0081906 A1 | 4/2012 | Verfuerth et al. |
| 2012/0086363 A1* | 4/2012 | Golding ............... H05B 37/00 315/312 |
| 2012/0098439 A1 | 4/2012 | Recker et al. |
| 2012/0112654 A1 | 5/2012 | Choong et al. |
| 2012/0112667 A1 | 5/2012 | Mohan et al. |
| 2012/0130544 A1 | 5/2012 | Mohan et al. |
| 2012/0143357 A1 | 6/2012 | Chemel et al. |
| 2012/0153844 A1 | 6/2012 | Chobot |
| 2012/0167957 A1 | 7/2012 | Verfuerth et al. |
| 2012/0182729 A1 | 7/2012 | Verfuerth et al. |
| 2012/0203601 A1 | 8/2012 | Verfuerth et al. |
| 2012/0209755 A1 | 8/2012 | Verfuerth et al. |
| 2012/0229049 A1 | 9/2012 | Mohan et al. |
| 2012/0233045 A1 | 9/2012 | Verfuerth et al. |
| 2012/0235579 A1 | 9/2012 | Chemel et al. |
| 2012/0262074 A1 | 10/2012 | Wang-Wei-Cheng |
| 2012/0274222 A1 | 11/2012 | Verfuerth et al. |
| 2012/0286673 A1 | 11/2012 | Holland et al. |
| 2012/0299485 A1 | 11/2012 | Mohan et al. |
| 2012/0326608 A1 | 12/2012 | Mohan et al. |
| 2013/0006437 A1 | 1/2013 | Verfuerth et al. |
| 2013/0020949 A1 | 1/2013 | Mohan et al. |
| 2013/0033183 A1 | 2/2013 | Verfuerth et al. |
| 2013/0063042 A1 | 3/2013 | Bora et al. |
| 2013/0069542 A1 | 3/2013 | Curasi et al. |
| 2013/0069543 A1 | 3/2013 | Mohan et al. |
| 2013/0088168 A1 | 4/2013 | Mohan et al. |
| 2013/0093323 A1 | 4/2013 | Radermacher |
| 2013/0094230 A1 | 4/2013 | Verfuerth et al. |
| 2013/0131882 A1 | 5/2013 | Verfuerth et al. |
| 2013/0141904 A1 | 6/2013 | Verfuerth et al. |
| 2013/0169185 A1 | 7/2013 | Dai et al. |
| 2013/0176401 A1 | 7/2013 | Monari et al. |
| 2013/0193857 A1 | 8/2013 | Tlachac et al. |
| 2013/0229795 A1 | 9/2013 | Wang et al. |
| 2013/0257292 A1 | 10/2013 | Verfuerth et al. |
| 2013/0293117 A1 | 11/2013 | Verfuerth |
| 2013/0293877 A1 | 11/2013 | Ramer et al. |
| 2013/0308325 A1 | 11/2013 | Verfuerth et al. |
| 2014/0028199 A1 | 1/2014 | Chemel et al. |
| 2014/0117852 A1 | 5/2014 | Zhai et al. |
| 2014/0252961 A1 | 9/2014 | Ramer et al. |
| 2014/0285090 A1 | 9/2014 | Chemel et al. |
| 2014/0285095 A1 | 9/2014 | Chemel et al. |
| 2014/0292208 A1 | 10/2014 | Chemel et al. |
| 2014/0293605 A1 | 10/2014 | Chemel et al. |
| 2014/0333222 A1 | 11/2014 | Chemel et al. |
| 2014/0375206 A1 | 12/2014 | Holland et al. |
| 2015/0008827 A1 | 1/2015 | Carrigan et al. |
| 2015/0008828 A1 | 1/2015 | Carrigan et al. |
| 2015/0061511 A1 | 3/2015 | Chemel et al. |
| 2016/0014856 A1 | 1/2016 | Wacheux |
| 2016/0050725 A1 | 2/2016 | Johnston et al. |
| 2016/0360594 A1 | 12/2016 | Chemel et al. |
| 2016/0374166 A1 | 12/2016 | Chen et al. |
| 2017/0019970 A1 | 1/2017 | Chemel et al. |
| 2017/0027045 A1 | 1/2017 | Chemel et al. |
| 2017/0042001 A1 | 2/2017 | Chemel et al. |
| 2017/0086279 A1 | 3/2017 | Chemel et al. |

FOREIGN PATENT DOCUMENTS

| | | |
|---|---|---|
| JP | 2006-106762 | 4/2006 |
| JP | 2007-045407 A | 2/2007 |
| WO | WO 96/20369 | 7/1996 |
| WO | WO 98/34206 A1 | 8/1998 |
| WO | WO 2007/003038 | 1/2007 |
| WO | WO 2007/116332 A2 | 10/2007 |
| WO | WO 2009/003279 | 1/2009 |
| WO | WO 2010/116283 A2 | 10/2010 |

OTHER PUBLICATIONS

Final Office Action in U.S. Appl. No. 12/817,425, dated Sep. 17, 2015, 9 pages.
Notice of Allowance in U.S. Appl. No. 14/245,196, dated Sep. 23, 2015, 2 pages.
Extended European Report and Opinion for European Appln No. EP 12844864.4, dated Nov. 3, 2015, 8 pages.
Extended European Report and Opinion for European Patent Application No. EP 13763788.0, dated Dec. 17, 2015, 7 pages.
Final Office Action in U.S. Appl. No. 14/267,368 dated Dec. 31, 2015, 32 pages.
Notice of Acceptance for Australian Patent Application No. 2012332206, dated Jan. 21, 2016, 2 pages.
Office Action in U.S. Appl. No. 13/425,295, dated Mar. 7, 2016, 16 pages.
Office Action in U.S. Appl. No. 14/294,081, dated Mar. 14, 2016, 16 pages.
Patent Examination Report No. 1 for Australian Patent Application No. 2013235436, dated Jan. 18, 2016, 3 pages.
Search Report and Office Action in Chinese Patent Application No. 201380026132.5 dated Sep. 12, 2015, 36 pages (original Chinese and English translation).
"Enlightened Energy Management System," ETCC Open Forum, 13 pp. (Jul. 24, 2012).
Office Action in U.S. Appl. No. 12/817,425, dated Mar. 23, 2016, 9 pages.
Final Office Action in U.S. Appl. No. 13/425,295, dated Mar. 7, 2016, 18 pages.
Office Action in U.S. Appl. No. 14/294,081, dated Mar. 14, 2016, 20 pages.
Examination Report in European Patent Application No. 09732558.3, dated Apr. 19, 2016, 5 pages.
Second Office Action in Chinese Patent Application No. 201380026132.5, dated Apr. 20, 2016, 6 pages (w/English translation).
Examination Report in Australian Patent Application No. 2015255250, dated Jun. 1, 2016, 3 pages.
Office Action in U.S. Appl. No. 14/960,105, dated Aug. 30, 2016, 50 pages.
Final Office Action in U.S. Appl. No. 14/294,081 dated Oct. 5, 2016, 20 pages.
Examination Report No. 1 dated Oct. 14, 2016 in Australian Patent Application No. 2015203026, 2 pages.
Supplementary European Search Report dated Nov. 28, 2016 in European Application No. EP 14 79 1232, 6 pages.
International Search Report and Written Opinion dated Oct. 14, 2016 in International Application No. PCT/US2016/043893, 14 pages.
Final Office Action in U.S. Appl. No. 12/817,425 dated Dec. 15, 2016, 10 pages.
Office Action in U.S. Appl. No. 14/518,831 dated Dec. 30, 2016, 51 pp.

(56) References Cited

OTHER PUBLICATIONS

Communication pursuant to Article 94(3) EPC, issued by the European Patent Office for Application No. 12761180.4, dated Jan. 27, 2017, 5 pages.
Office Action issued by the Canadian Patent Office for Application No. 2721486, dated Oct. 14, 2016, 4 pages.
Notice of Acceptance issued by the Australian Patent Office for Application No. 2014218445, dated Jul. 15, 2016, 2 pages.
Notice of Acceptance issued by the Australian Patent Office for Application No. 2015255250, dated Jan. 24, 2017, 3 pages.
Notification of Fulfilling of Registration Formality issued by the Patent Office of the People's Republic of China for Application No. 201380026132.5, dated Aug. 3, 2016 (English Translation), 2 pages.
Notice of Acceptance issued by the Australian Patent Office for Application No. 2013235436, dated Nov. 16, 2016, 2 pages.
Final Office Action in U.S. Appl. No. 14/294,081 dated Jun. 10, 2015, 13 pages.
Office Action in U.S. Appl. No. 13/425,295 dated Jun. 29, 2015, 17 pages.
Office Action in Canadian Application No. 2,721,486 dated Jul. 14, 2015, 4 pages.
Office Action in U.S. Appl. No. 14/267,386 dated Aug. 10, 2015, 27 pages.
Notice of Allowance in U.S. Appl. No. 14/289,601, dated Apr. 1, 2015, 9 pages.
Notice of Acceptance in Australian Patent Application No. 2011323165, dated Apr. 10, 2015, 2 pages.
Office Action in U.S. Appl. No. 14/267,386, dated Apr. 17, 2015, 30 pages.
Notice of Allowance in U.S. Appl. No. 14/294,082, dated May 19, 2015, 8 pages.
Notice of Allowance in U.S. Appl. No. 14/289,601, dated Jun. 4 2015, 2 pages.
Final Office Action in U.S. Appl. No. 14/245,196, dated May 27, 2015, 6 pages.
Garg, Visha et al., "Smart occupancy sensors to reduce energy consumption, Energy and Buildings," vol. 32, Issue 1, Jun. 2000, pp. 81-87. ISSN 0378-7788, 10.1 016/S0378-7788(99)00040-7. (http://www.sciencedirect.com/science/article/pii/S037877889.
Progress Report: Reducing Barriers to Use of High Efficiency Lighting Systems; Oct. 2001, (http://www.lrc.rpi.edu/researchAreas/reducingBarriers/pdf/year1FinalReport.pdf), 108 pages.
ZigBee Alliance "Wireless Sensors and Control Networks: Enabling New Opportunities with ZigBee", Bob Heile, Chairman, ZigBee Alliance, Dec. 2006 Powerpoint Presentation, 53 pages.
ZigBee Specification Document 053474r17, Notice of Use and Disclosure; Jan. 17, 2008 11:09 A.M., Sponsored by: ZibEe Alliance; Copyright © 2007 ZigBee Standards Organizat. All rights reserved, 602 pages.
Vainio, A.-M. et al., Learning and adaptive fuzzy control system for smart home, Mar. 2008, http://www.springerlink.com/content/ll72k3200614qx81/fulltext.pdf, 10 pages.
ZigBee Alliance Document No. 08006r03, Jun. 2008, ZigBee-200y Layer Pics and Stack Profile, Copyright © 1996-2008 by the ZigBee Alliance. 2400 Camino Ramon, Suite 375, San Ramon, CA 94583, USA; http://www.zigbee.org, 119 pages.
International Search Report in International Application No. PCT/US2009/040514 dated Jun. 26, 2009, 4 pages.
Written Opinion in International Application No. PCT/US2009/040514, dated Jun. 26, 2009, 3 pages.
International Preliminary Report on Patentability of PCT/US2009/040514, dated Oct. 19, 2010, 4 pages.
Albeo Technologies, C Series, http://www.albeotech.com/?site_id=1500&item_id=161711, retrieved May 18, 2011, 2 pages.
Albeo Technologies, C3 Series, http://www.albeotech.com/?site_id=1500&item_id=173338, retrieved May 18, 2011, 2 pages.
Albeo Technologies, S Series, http://www.albeotech.com/?site_id=1500&item_id=161722, retrieved May 18, 2011, 2 pages.
Albeo Technologies, Surface Mounts, http://www.albeotech.com/?site_id=1500&item_id=161724, retrieved May 18, 2011, 2 pages.
Beta LED, 227 Series LED Canopy, http://www.betaled.com/us-en/TechnicalLibrary/TechnicalDocuments/227-series-canopy.aspx, retrieved May 18, 2011, 2 pages.
Beta LED, 227 Series LED Soffit, http://www.betaled.com/us-en/TechnicalLibrary/TechnicalDocuments/227-series-soffit.aspx, retrieved May 18, 2011, 2 pages.
Beta LED, 304 Series LED Interior, http://www.betaled.com/us-en/TechnicalLibrary/TechnicalDocuments/304-series-canopy.aspx, retrieved May 18, 2011, 2 pages.
Beta LED, 304 Series LED Parking Structure, http://www.betaled.com/us-en/TechnicalLibrary/TechnicalDocuments/304-series-parking.aspx, retrieved May 18, 2011, 2 pages.
Beta LED, 304 Series LED Soffit, http://www.betaled.com/us-en/TechnicalLibrary/TechnicalDocuments/304-series-soffit.aspx, retrieved May 18, 2011, 2 pages.
Beta LED, The Edge Canopy, http://www.betaled.com/us-en/TechnicalLibrary/TechnicalDocuments/TheEdgeCanopy.aspx, retrieved May 18, 2011, 2 pages.
Beta LED, The Edge LED Parking Structure, http://www.betaled.com/us-en/TechnicalLibrary/TechnicalDocuments/TheEdgeParking.aspx, retrieved May 18, 2011, 2 pages.
Color Kinetics, eW Cove EC Powercore line, http://www.colorkinetics.com/support/datasheets/eW_Cove_EC_Powercore_2700K_12in_SpecSheet.pdf, retrieved May 18, 2011, 2 pages.
Color Kinetics, eW Cove MX Powercore line, http://www.colorkinetics.com/support/datasheets/eW_Cove_MX_Powercore_2700K_Wide_Beam_Angle_SpecSheet.pdf, retrieved May 18, 2011, 2 pages.
Color Kinetics, eW Cove QLX Powercore line, http://www.colorkinetics.com/support/datasheets/eW_Cove_QLX_Powercore_6in_110degreex110degree.pdf, retrieved May 18, 2011, 2 pages.
Color Kinetics, eW Fuse Powercore line, http://www.colorkinetics.com/support/datasheets/eW_Fuse_Powercore_2700K_10degree_x_60degree.pdf, retrieved May 18, 2011, 2 pages.
Color Kinetics, eW Graze Powercore line, http://www.colorkinetics.com/support/datasheets/eW_Graze_Powercore_SpecSheet_2700K_10x60.pdf, retrieved May 18, 2011, 2 pages.
Office Action in U.S. Appl. No. 12/423,543, dated Jun. 27, 2011, 14 pages.
Notice of Allowance in U.S. Appl. No. 12/823,195, dated Oct. 27, 2011, 7 pages.
Office Action in U.S. Appl. No. 12/817,425, dated Nov. 3, 2011, 14 pages.
Notice of Allowance in U.S. Appl. No. 12/823,195, dated Dec. 12, 2011, 8 pages.
Office Action in U.S. Appl. No. 12/822,421, dated Jan. 19, 2012, 20 pages.
International Search Report and Written Opinion in International Application No. PCT/US2011/059334, dated Feb. 2, 2012, 11 pages.
Notice of Allowance in U.S. Appl. No. 12/423,543, dated Feb. 8, 2012, 12 pages.
Office Action in U.S. Appl. No. 12/830,868, dated Mar. 5, 2012, 5 pages.
Office Action in U.S. Appl. No. 12/822,577, dated Apr. 2, 2012, 25 pages.
Office Action in U.S. Appl. No. 12/831,476, dated Apr. 11, 2012, 7 pages.
Notice of Allowance in U.S. Appl. No. 12/423,543, dated Apr. 11, 2012, 8 pages.
Office Action in U.S. Appl. No. 12/817,425, dated Apr. 30, 2012, 18 pages.
Office Action in U.S. Appl. No. 12/828,495, dated May 17, 2012, 6 pages.
Notice of Allowance in U.S. Appl. No. 12/423,543, dated Jun. 21, 2012, 4 pages.
Office Action in U.S. Appl. No. 12/824,797, dated Jun. 29, 2012, 5 pages.

(56) References Cited

OTHER PUBLICATIONS

Office Action in U.S. Appl. No. 12/828,340, dated Jul. 2, 2012, 4 pages.
Office Action in U.S. Appl. No. 12/827,397, dated Jul. 11, 2012, 6 pages.
International Search Report and Written Report in International Application No. PCT/US12/029834, dated Jul. 12, 2012, 10 pages.
Office Action in U.S. Appl. No. 12/830,868, dated Aug. 13, 2012, 26 pages.
Office Action in U.S. Appl. No. 12/833,332, dated Aug. 20, 2012, 5 pages.
Extended European Report and Opinion for European Appln No. EP 09732558.3, dated Aug. 23, 2012, 8 pages.
Office Action in U.S. Appl. No. 12/822,421, dated Sep. 12, 2012, 16 pages.
Office Action in U.S. Appl. No. 12/828,385, dated Sep. 12, 2012, 5 pages.
Office Action in U.S. Appl. No. 12/832,179, dated Sep. 12, 2012, 5 pages.
Office Action in U.S. Appl. No. 12/832,211, dated Sep. 12, 2012, 4 pages.
Office Action in U.S. Appl. No. 12/833,181, dated Sep. 12, 2012, 5 pages.
Office Action in U.S. Appl. No. 12/827,336, dated Oct. 4, 2012, 26 pages.
Office Action in U.S. Appl. No. 12/822,577, dated Oct. 11, 2012, 21 pages.
Office Action in U.S. Appl. No. 12/831,476, dated Oct. 17, 2012, 36 pages.
Notice of Allowance in U.S. Appl. No. 12/827,397, dated Oct. 29, 2012, 5 pages.
Notice of Allowance in U.S. Appl. No. 12/824,797 dated Nov. 9, 2012, 8 pages.
Notice of Allowance in U.S. Appl. No. 12/828,340, dated Nov. 21, 2012, 5 pages.
Office Action in U.S. Appl. No. 12/833,332 dated Nov. 23, 2012, 5 pages
Office Action in U.S. Appl. No. 12/828,495, dated Dec. 12, 2012, 21 pages.
International Preliminary Report on Patentability of PCT/US2011/059334, dated May 7, 2013, 8 pages
Office Action in U.S. Appl. No. 12/831,476, dated Feb. 13, 2013, 42 pages.
Notice of Allowance in U.S. Appl. No. 12/822,421, dated Mar. 1, 2013, 9 pages.
Office Action in U.S. Appl. No. 12/832,179, dated Mar. 13, 2013, 13 pages.
Notice of Allowance in U.S. Appl. No. 12/822,577, dated Mar. 15, 2013, 10 pages.
International Search Report and Written Opinion in International Application No. PCT/US2012/063372, dated Mar. 19, 2013, 18 pages.
Office Action in U.S. Appl. No. 12/828,385, dated Mar. 19, 2013, 12 pages.
Notice of Allowance in U.S. Appl. No. 12/833,332, dated Mar. 21, 2013, 8 pages.
Notice of Allowance in U.S. Appl. No. 12/830,868, dated Mar. 25, 2013, 9 pages.
Office Action in U.S. Appl. No. 12/828,495, dated Mar. 28, 2013, 22 pages.
Examination Report in Australian Patent Application No. 2009236311, dated May 10, 2013, 3 pages.
Notice of Allowance in U.S. Appl. No. 12/833,181, dated May 23, 2013, 18 pages.
International Search Report and Written Opinion in International Application No. PCT/US2013/031790, dated Jun. 3, 2013, 13 pages.
Office Action in U.S. Appl. No. 12/827,336, dated Jun. 13, 2013, 6 pages.
Office Action in U.S. Appl. No. 12/831,358, dated Jun. 13, 2013, 7 pages.
Office Action in U.S. Appl. No. 12/832,211, dated Jun. 20, 2013, 12 pages.
Notice of Allowance in U.S. Appl. No. 12/830,868, dated Jun. 24, 2013, 6 pages.
Office Action in U.S. Appl. No. 12/832,179, dated Jul. 17, 2013, 15 pages.
Office Action in U.S. Appl. No. 12/831,476, dated Jul. 23, 2013, 42 pages.
Office Action in U.S. Appl. No. 12/817,425, dated Sep. 10, 2013, 15 pages.
International Preliminary Report on Patentability in International Application No. PCT/US2012/029834, dated dated Sep. 24, 2013, 7 pages.
Office Action in U.S. Appl. No. 12/832,211, dated Oct. 2, 2013, 13 pages.
Notice of Allowance in U.S. Appl. No. 12/827,336, dated Oct. 2, 2013, 12 pages.
Office Action in U.S. Appl. No. 12/828,495, dated Oct. 10, 2013, 25 pages.
Office Action in U.S. Appl. No. 12/831,358, dated Nov. 19, 2013, 16 pages.
Office Action in U.S. Appl. No. 12/831,476, dated Nov. 21, 2013, 52 pages.
Office Action in U.S. Appl. No. 12/827,209, dated Jan. 10, 2014, 20 pages.
Notice of Allowance in U.S. Appl. No. 12/828,495, dated Feb. 19, 2014, 8 pages.
Notice of Allowance in U.S. Appl. No. 14/045,679, dated Feb. 20, 2014, 8 pages.
Office Action in U.S. Appl. No. 12/832,179, dated Feb. 21, 2014, 16 pages.
Office Action in U.S. Appl. No. 13/289,492, dated Feb. 27, 2014, 28 pages.
Advisory Action in U.S. Appl. No. 12/831,358, dated Feb. 27, 2014, 2 pages.
Office Action in U.S. Appl. No. 12/817,425, dated Mar. 27, 2014, 16 pages.
Notice of Allowance in U.S. Appl. No. 12/832,211, dated Apr. 23, 2014, 10 pages.
International Preliminary Report on Patentability in International Application No. PCT/US2012/063372, dated Mar. 19, 2013, 14 pages.
Office Action in U.S. Appl. No. 13/425,295, dated Jun. 10, 2014, 12 pages.
Notice of Allowance in U.S. Appl. No. 12/831,476, dated Jun. 11, 2014, 5 pages.
Notice of Acceptance in Australian Application No. 2009236311, dated Jun. 12, 2014, 2 pages.
Notice of Allowance in U.S. Appl. No. 12/832,179, dated Aug. 1, 2014, 9 pages.
Office Action in U.S. Appl. No. 13/289,492, dated Aug. 5, 2014, 29 pages.
Examination Report in Australian Patent Application No. 2011323165, dated Aug. 22, 2014, 3 pages.
Notice of Allowance in U.S. Appl. No. 12/831,358, dated Aug. 29, 2014, 9 pages.
Final Office Action in U.S. Appl. No. 12/817,425, dated Sep. 15, 2014, 17 pages.
International Search Report and Written Opinion in International Application No. PCT/US2014/35990, dated Sep. 18, 2014, 11 pages.
International Preliminary Report on Patentability in International Application No. PCT/US2013/031790, dated Sep. 23, 2014, 10 pages.
Restriction Requirement in U.S. Appl. No. 14/294,081, dated Oct. 9, 2014, 6 pages.
Examination Report in Australian Patent Application No. 2012230991, dated Nov. 18, 2014, 3 pages.
Notice of Allowance in U.S. Appl. No. 13/289,492, dated Nov. 19, 2014, 9 pages.

(56) References Cited

OTHER PUBLICATIONS

Restriction Requirement in U.S. Appl. No. 12/817,425, dated Dec. 10, 2014, 6 pages.
Final Office Action in U.S. Appl. No. 13/425,295, dated Jan. 2, 2015, 17 pages.
Office Action in U.S. Appl. No. 14/294,082, dated Jan. 2, 2015, 10 pages.
Office Action in U.S. Appl. No. 14/294,081, dated Jan. 22, 2015, 7 pages.
Notice of Allowance in U.S. Appl. No. 13/289,492, dated Jan. 23, 2015, 10 pages.
International Search Report and Written Opinion in International Application No. PCT/US2014/060095, dated Jan. 29, 2015, 16 pages.
Office Action in U.S. Appl. No. 14/289,601, dated Jan. 30, 2015, 6 pages.
Office Action in U.S. Appl. No. 14/245,196, dated Feb. 9, 2015, 13 pages.
Examination Report in Australian Patent Application No. 2012332206, dated Feb. 12, 2015, 3 pages.
Office Action in U.S. Appl. No. 12/817,425, dated Feb. 25, 2015, 6 pages.
Communication pursuant to Article 94(3) EPC, issued by the European Patent Office for Application No. 13763788.0, dated Apr. 4, 2017, 5 pages.
European Search Report issued by the European Patent Office for Application No. 14852889.6, dated May 19, 2017, 8 pages.
Examination Report No. 1 issued by the Australian Patent Office for Application No. 2014259974, dated Apr. 3, 2017, 3 pages.
Examination Report No. 1 issued by the Australian Patent Office for Application No. 2016206250, dated May 1, 2017, 3 pages.
Examination Report No. 2 issued by the Australian Patent Office for Application No. 2015203026, dated May 16, 2017, 3 pages.
Extended European Search Report issued by the European Patent Office for Application No. 11838876.8, dated Apr. 11, 2017, 8 pages.
Non-Final Office Action in U.S. Appl. No. 14/927,413, dated May 5, 2017, 12 pages.
Non-Final Office Action in U.S. Appl. No. 15/175,725, dated Jun. 1, 2017, 14 pages.
Non-Final Office Action in U.S. Appl. No. 14/294,081, dated Jun. 15, 2017, 15 pages.
Notice of Allowance in U.S. Appl. No. 14/960,105, dated May 10, 2017, 8 pages
Examination Report issued by the Canadian Patent Office for Application No. 2,830,991, dated Jul. 13, 2017, 3 pages.
Examination Report issued by the European Patent Office for Application No. 12844864.4, dated Aug. 16, 2017, 3 pages.
Examination Report No. 1 issued by the Australian Patent Office for Application No. 2016202824, dated Jul. 17, 2017, 6 pages.
Examination Report No. 1 issued by the Australian Patent Office for Application No. 2017201414, dated Jun. 6, 2017, 3 pages.
Non-Final Office Action in U.S. Appl. No. 12/817,425, dated Aug. 3, 2017, 17 pages.
Non-Final Office Action in U.S. Appl. No. 15/298,064, dated Aug. 11, 2017, 15 pages.
Notice of Allowance in U.S. Appl. No. 14/518,831, dated Aug. 21, 2017, 13 pages.
Notice of Allowance in U.S. Appl. No. 14/960,105, dated Jul. 12, 2017, 6 pages.
Office Action issued by the European Patent Office for Application No. 12 761 180.4, dated Aug. 24, 2017, 5 pages.
Notice of Allowance in U.S. Appl. No. 14/927,413, dated Nov. 7, 2017, 14 pages.
Non-Final Office Action in U.S. Appl. No. 15/094,559, dated Sep. 28, 2017, 29 pages.
Office Action issued by the Canadian Patent Office for Application No. 2,721,486, dated Sep. 19, 2017, 3 pages.
Office Action issued by the Canadian Patent Office for Application No. 2,816,978, dated Oct. 3, 2017, 4 pages.

\* cited by examiner

METHOD, APPARATUS, AND SYSTEM FOR OCCUPANCY SENSING

CROSS-REFERENCE TO RELATED PATENT APPLICATIONS

This application claims the benefit, under 35 U.S.C. § 120, as a continuation application of U.S. Non-Provisional application Ser. No. 13/289,492, now U.S. Pat. No. 9,014,829, filed on Nov. 4, 2011, and entitled "Method, Apparatus, and System for Occupancy Sensing," which in turn claims the priority benefit, under 35 U.S.C. § 119(e), of U.S. Provisional Patent Application No. 61/409,991, filed on Nov. 4, 2010, and entitled "Occupancy Sensor," which applications are hereby incorporated herein by reference.

BACKGROUND

In many situations, it is desirable (but not necessary) for lighting to be activated as soon as a person/object of interest enters a particular area of interest. This can be accomplished by using occupancy and/or motion sensors to monitor the area of interest. When a sensor detects occupancy and/or motion, e.g., based on radiation or a change in radiation emitted in the area of interest, it sends a signal to a lighting fixture that causes the lighting fixture to illuminate the area of interest. The lighting fixture illuminates the area for as long as the sensor detects an occupant. As soon as the sensor stops detecting the occupant, a timer in the lighting fixture begins counting down a predetermined timeout or delay period during which the light remains on. The lighting fixture turns off when the delay period ends (unless the occupancy sensor detects another occupant, in which case the timer stops counting down). Consider, for example, a sensor whose timeout period is 60 seconds: if a person enters the sensor's field-of-view at 11:27:03 and stays in the field-of-view until 11:31:18, the light remains on until 11:32:18 provided that nobody else enters the field-of-view. If the predetermined timeout or delay period is too long, then the light remains on unnecessarily, wasting energy and running down its useful life. If the predetermined amount of time is too short, then the light turns off prematurely, which may be annoying and possibly dangerous as well.

Occupancy sensors sense radiation at different wavelengths, including infrared, ultrasonic, visible, and/or radio-frequency wavelengths, to detect the presence or absence of people in a space. Passive infrared (PIR) sensors sense the difference in heat emitted by humans in motion from that of the background space. These sensors detect motion within a field of view that generally requires a clear line of sight; they cannot "see" through obstacles and have limited sensitivity to minor (hand) movement at distances greater than about 15 feet. PIR sensors tend to be most sensitive to movement laterally across their respective fields of view, which can be adjusted when the sensor is installed.

PIR sensors generally are most suitable for smaller, enclosed spaces (wall switch sensors), spaces where the sensor has a view of the activity (ceiling- and wall-mounted sensors), and outdoor areas and warehouse aisles. Potentially incompatible application characteristics include low motion levels by occupants, obstacles blocking the sensor's view, mounting on sources of vibration, or mounting within six feet to eight feet of HVAC air diffusers.

Ultrasonic sensors use the Doppler principle to detect occupancy by emitting an ultrasonic high-frequency signal (e.g., 32-40 kHz) throughout a space, sensing the frequency of a signal reflected by a moving object, and interpreting a change in frequency as motion. The magnitude and sign of the change in frequency represent the speed and direction, respectively, of the object with respect to the sensor. Ultrasonic sensors do not require a direct line of sight and instead can "see" around corners and objects, although they may need a direct line of sight if fabric partition walls are prevalent. In addition, ceiling-mounted sensor effective range declines proportionally to partition height. Ultrasonic sensors are more effective for low motion activity, with high sensitivity to minor (e.g., hand) movement, typically up to 25 feet. Ultrasonic sensors tend to be most sensitive to movement towards and away from the sensor. Ultrasonic sensors typically have larger coverage areas than PIR sensors.

Ultrasonic sensors are most suitable for open spaces, spaces with obstacles, restrooms, and spaces with hard surfaces. Potentially incompatible application characteristics include high ceilings (greater than 14 feet), high levels of vibration or air flow (which can cause nuisance switching), and open spaces that require selective coverage (such as control of lighting in individual warehouse aisles).

Dual-technology sensors employ both PIR and ultrasonic technologies, activating the lights only when both technologies detect the presence of people, which virtually eliminates the possibility of false-on. Dual-technology sensors keep the lights on so long as they continue to detect the presence of people using at least one of the two sensing technologies, which significantly reduces the possibility of false-off. Appropriate applications include classrooms, conference rooms, and other spaces where a higher degree of detection may be desirable.

For effective occupancy sensing, generally required coverage area and required sensitivity are coordinated by a lighting designer/engineer. Generally the designer must determine range and coverage area for the sensor based on the desired level of sensitivity. Manufacturers of sensors publish range and coverage area for sensors in their product literature, which may be different for minor (e.g., hand) motion and major (e.g., full-body) motion. Various coverage sizes and shapes are available for each sensor type. In a small space, one sensor may easily provide sufficient coverage. In a large space, it may be desirable to partition the lighting load into zones, with each zone controlled by one sensor.

The lighting designer/engineer must also decide how long each light should remain on after the associated occupancy and/or motion sensor no longer detects motion. This timeout parameter is controlled typically in hardware, so the designer may have only a few discrete options, e.g., 30 seconds, one minute, two minutes, five minutes, etc., for a particular type of lighting fixture. The operating characteristics and requirements of the lighting fixtures often determine the minimum timeouts. For example, fluorescent and high-intensity discharge (HID) fixtures have relatively long warm-up times, so they may have minimum timeouts of about 10-15 minutes to minimize wear and tear that would otherwise reduce the fixture life.

The timeout parameter is controlled typically by setting a switch (e.g., dual in-line package (DIP) switches), dial, or other interface on the lighting fixture itself. Once the lighting fixture is installed, it may become difficult to change the timeout settings (if they can be changed at all). For example, industrial lighting fixtures, such as the high-bay lighting fixtures that illuminate aisles in a warehouse, are often too high to be reached without a lift. Even if the fixture is relatively easy to reach, it may be impractical to change the timeout parameter because the people who own, maintain, and/or use the facility have no way to determine the appropriate or optimum timeout setting.

U.S. Patent Application Publication No. 2007/0273307 to Westrick et al. discloses an automated lighting system that performs adaptive scheduling based on overrides from users. More specifically, Westrick's system follows a predetermined schedule to switch a lighting fixture from an "ON" mode (in which the fixture turns on in response to a signal from an occupancy sensor) to an "OFF" mode (in which the fixture does not respond to signals from the occupancy sensor). Firmware adjusts the amount of time the system spends in "ON" mode based on how often users override the lighting controls by actuating an override switch, such as an on/off paddle switch. If the system detects a high number of overrides immediately after a period in "ON" mode, the system increases the amount of time that the system is "ON" (and decreases the amount of time that the system is "OFF"). Although Westrick's system adjusts how long a light is enabled to respond to occupancy signals, it does not change how long the light remains on in response to an occupancy signal. It also requires direct user intervention. Westrick's system does not log or record any occupancy sensor data, so it is incapable of detecting, analyzing, and responding to more complicated occupancy behavior, such changes in occupancy patterns based on the hour of the day or the day of the week.

U.S. Pat. No. 8,035,320 to Sibert discloses an illumination control network formed of luminaires whose behaviors are governed by a set of parameters, which may be selected from templates or set by direct user intervention. Sibert's luminaire has an occupancy response behavior that depends in part on a high threshold, a low threshold, and a decaying average, or running average, that represents the average output level from an occupancy sensor over a recent time interval. When the luminaire receives a signal from the occupancy sensor, it updates the running average, then compares the updated running average to the high and low thresholds. If the updated running average is lower than the low threshold, the luminaire remains off (or turns off). If the updated running average is higher than the high threshold, the luminaire turns on (or remains on) for a predetermined timeout period. If the updated running average is between the high and low thresholds, the luminaire remains in its current state until it receives another signal from the occupancy sensor or, if the luminaire is already on, until the timeout period elapses. The luminaire does not adjust the length of the timeout period in response to an occupancy signal. Like Westrick's system, Sibert's luminaires do not log or record any occupancy sensor data, so they are cannot detect, analyze, or respond to more complicated occupancy behavior, such changes in occupancy patterns based on the hour of the day or the day of the week.

SUMMARY

One embodiment of the invention includes an occupancy sensing unit to monitor an environment illuminated by a lighting fixture and associated methods of sensing occupancy in an illuminated environment. An example occupancy sensing unit comprises an occupancy sensor, a memory operatively coupled to the occupancy sensor, and a processor operatively coupled to the memory. The sensor detects radiation indicative of an occupancy event in the environment illuminated by the lighting fixture according to sensing parameters, including but not limited to gain, threshold, offset, polling frequency, and duty cycle, and provides data representing the occupancy event. The memory logs sensor data, possibly at the direction of the processor, which performs an analysis of the sensor data logged in the memory and adjusts the sensing parameters of the occupancy sensor based on the analysis of the sensor data logged in the memory.

In a further embodiment, the occupancy sensor provides an analog signal representative of the occupancy event. An analog-to-digital converter operatively coupled to the occupancy sensor provides a digital representation of the analog signal at one of a plurality of digital levels. The different levels in the plurality of digital levels represent different types of occupancy events.

The occupancy sensor may also comprise two or more sensing elements to provide one or more signals indicative of a velocity and/or a trajectory associated with the occupancy event. These signals can be used to provide sensor data that represents the velocity associated with the occupancy event. The processor may determine of a frequency with which a particular velocity and/or a particular trajectory appears in the sensor data and adjust the sensing parameters, sensor timeout, lighting fixture timeout, and/or lighting levels accordingly.

The processor may also perform other types of analysis, such as creating an n-dimensional array of the sensor data logged in the memory, wherein each dimension of the array corresponds to a parameter associated with the occupancy event. Suitable parameters include, but are not limited to: frequency, amplitude, duration, rate of change, duty cycle, time of day, day of the week, month of the year, ambient light level, and/or ambient temperature associated with the sensor data logged in the memory. The processor can partition the n-dimensional array into clusters corresponding to different types of occupancy events and adjust the sensing parameters, which include, but are not limited to sensor timeout, gain, threshold, offset, and/or sensitivity, based on the partitioning. Alternatively, or in addition, the processor can determine a distribution of a frequency (e.g., a histogram) with which the occupancy sensor detects occupancy events and, optionally, adjust the sensing parameters based on the frequency distribution.

The processor may also place the LED in an inactive state after elapsation of a sensor delay following an end of the at least one occupancy event (as shown, for example, by a change in state of an output from the occupancy sensor). In addition, the processor can vary the length of the sensor delay based on its analysis of the logged sensor data.

Another exemplary occupancy sensing unit can include a communications interface to provide sensor data and/or a signal indicative of the occupancy event to a controller of a lighting fixture, a lighting management system, and/or another occupancy sensing unit. Such an occupancy sensing unit may be combined with or coupled to a light-emitting diode (LED) lighting fixture that includes one or more LEDs to illuminate the environment and a controller, operatively coupled to the LEDs and to the occupancy sensing unit, to actuate the LEDs in response to a signal indicative of an occupancy event. The controller can set the LEDs to a first lighting level in response to a signal indicative of a first type of occupancy event, and to a second lighting level in response to a signal indicative of a second type of occupancy event. Alternatively, or in addition, the controller can change a light level of the LEDs after a first elapsed time in response to a signal indicative of a first type of occupancy event, and change the light level of the LEDs after a second elapsed time in response to a signal indicative of a second type of occupancy event.

Yet another embodiment includes a lighting system to provide variable occupancy-based illumination of an environment. Such a lighting system comprises a plurality of lighting fixtures, each of which includes a light source to illuminate the environment, an occupancy sensor to respond to an occupancy event, a communications interface, a memory, and a controller. The occupancy sensor provides a first occupancy signal representing the occupancy event, which is logged to memory and transmitted to other lighting fixture in the plurality of lighting fixtures via the communications interface. The communications interface also receives a second occupancy signal from another lighting fixture in the plurality of lighting fixtures, and the memory stores sensor data representing the second occupancy signal as well. The controller, which is operatively coupled to the light source, the communications interface, and the memory, places the light source in an inactive state after elapsation of a delay period following an end of the at least one occupancy event (as shown, for example, by a change in state of the first and/or second occupancy signals). The controller performs an analysis of the sensor data logged in the memory, adjusts the delay period based on the analysis of the sensor data logged in the memory, and may optionally control a light level of the light source based at least in part on the first and second occupancy signals. In some cases, at least two of the plurality of lighting fixtures are configured to provide respective signals indicative of a velocity and/or a trajectory associated with an occupancy event.

As referred to herein, an "occupancy event" is any type of detectable incursion by or presence of a person or object into a space monitored by an occupancy sensor. Occupancy events include, but are not limited to: entry of a person or vehicle into a space monitored by an occupancy sensor and the presence of a person or object in a space monitored by an occupancy sensor. Detectable signatures of occupancy events include, but are not limited to: thermal radiation (i.e., heat) emitted by persons or objects, images of persons or objects, radiation reflected by persons objects, and Doppler shifts of radiation reflected by moving persons or moving objects.

As referred to herein, "sensor timeout" or "sensor delay" is the time elapsed between the end of an occupancy event (i.e., when the occupancy sensor stops seeing activity) and the moment that the lighting fixture goes into an "inactive" state. Similarly, a "lighting fixture timeout" or "lighting fixture delay" is the time between when the sensor output indicates the end of an occupancy event and the moment that the lighting fixture goes into an "inactive" state. In one example, the occupancy sensor has a sensor timeout (e.g., 30 seconds) that is fixed in hardware, and the processor implements a lighting fixture timeout that can be varied from about zero seconds to over four hours (e.g., 16,384 seconds) in increments of one second. The processor uses the variable lighting fixture timeout to provide an adjustable amount of time between the end of occupancy event and the moment that the lighting fixture goes into an "inactive" state. In other examples, the sensor timeout and lighting fixture timeout may coincident, in which case they are referred to collectively as a "timeout" or "delay."

The following U.S. published applications are hereby incorporated herein by reference: U.S. publication no. 2009-0267540-A1, published Oct. 29, 2009, filed Apr. 14, 2009, and entitled "Modular Lighting Systems"; U.S. publication no. 2010-0296285-A1, published Nov. 25, 2010, filed Jun. 17, 2010, and entitled "Fixture with Rotatable Light Modules"; U.S. publication no. 2010-0301773-A1, published Dec. 2, 2010, filed Jun. 24, 2010, and entitled "Fixture with Individual Light Module Dimming;" U.S. Provisional Application No. 61/510,173, filed on Jul. 21, 2011, and entitled "Lighting Fixture"; and U.S. Provisional Application No. 61/555,075, filed on Nov. 3, 2011, and entitled "Methods, Apparatus, and Systems for Intelligent Lighting."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following below are more detailed descriptions of various concepts related to, and embodiments of, inventive systems, methods, and apparatus for occupancy sensing. Inventive aspects include tailoring an occupancy sensor system to provide increased performance for industrial facilities, warehouses, cold storage facilities, etc. The inventive occupancy sensor methods, apparatus, and systems described herein also facilitate accurately sensing occupancy as well as harvesting occupancy data, e.g., for use in various lighting and energy conservation purposes. Inventive occupancy sensing units may report the harvested data back to an integral processor and/or external management system that use the harvested data to change lighting fixture behaviors, such as light levels and timeout parameters, so as to reduce energy consumption and increase safety based on actual occupancy patterns. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Inventive aspects of the occupancy sensing units include, but are not limited to: tunable occupancy sensing, self-learning occupancy sensing, cooperative occupancy sensing, and dual-function sensing that facilitate mapping and other functionality. Tunable occupancy sensing units may employ software-based tuning of the occupancy sensor gain and cutoff characteristics for improving the precision of occupancy event detection and classification. In some cases, a sensor may be tuned to enhance detection of and discrimination among multiple object types (e.g., a person on foot, a moving forklift, etc.). Tuning can be used in conjunction with self-learning to set timeouts, active light levels, and inactive light levels based on patterns in past occupancy data. Past occupancy data can also be used to determine signatures associated with particular types of occupant activities. Some occupancy sensing units may even include cameras, radio-frequency antennas (e.g., Bluetooth sniffers), and other sensors to capture additional historical data for analysis. Inventive occupancy sensing units may also share both real-time and historical occupancy sensing data with each other to increase detection reliability, to identify malfunctioning sensors, and to provide more flexible lighting responses.

Figure 1:
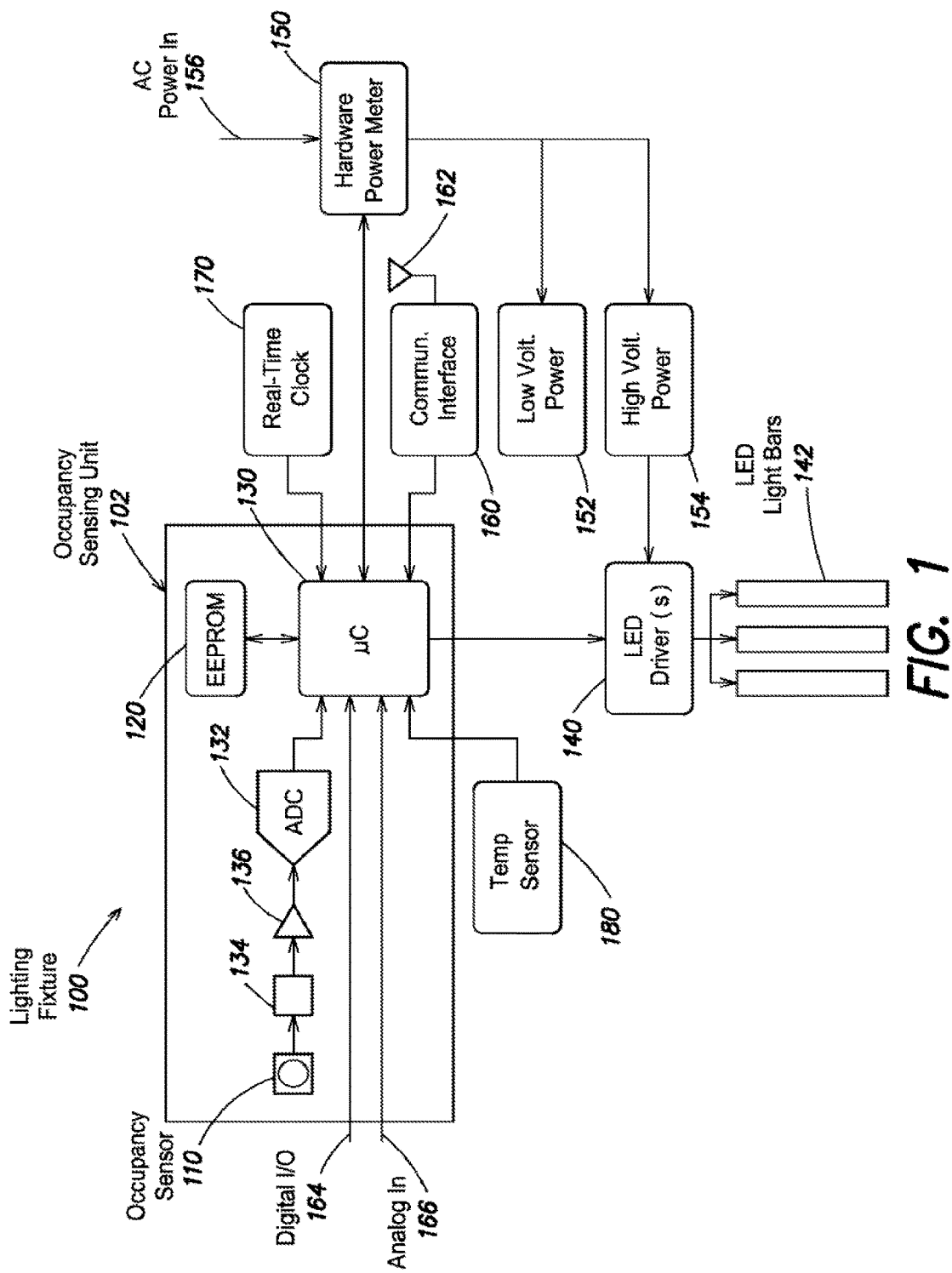
FIG. 1 is a block diagram of a light fixture with an occupancy sensing unit, according to embodiments of the present invention.

FIG. 1 shows a lighting fixture 100 that can be used to illuminate an environment in response to occupancy events that occur within or in the vicinity of the illuminated environment. The lighting fixture 100 includes an occupancy sensor 110 that is operably coupled to a memory 120 (shown in FIG. 1 as an electrically erasable programmable read-only memory (EEPROM)) via a filter 134, an amplifier 136, a multi-bit analog-to-digital converter (ADC) 132, and a processor 130. Together, the occupancy sensor 110, memory 120, and processor 130 form an occupancy sensing unit 102 that detects occupancy events, stores data representing the occupancy events, analyzes the stored data, and/or controls the lighting fixture 100 based on the occupancy events and/or the analysis of the stored data.

More specifically, upon detection of an occupancy event, the processor 130 may send a signal to one or more light-emitting diode (LED) drivers 140, which respond to the signal by changing the amount of light emitted by one or more LED light bars 142. The processor 130 may continue transmitting the signal to the LED drivers 140 for as long as the occupancy sensor 110 detects occupancy, or it may send a second signal to the LED drivers 140 as soon as the occupancy 110 stops detecting occupancy (i.e., when the occupancy event ends). At this point, the lighting fixture 100 enters a delay or timeout period during which the LED light bars 142 remain in the active state (or possibly transition to a state of intermediate activity, e.g., 50% illumination). Once the delay period has elapsed, as indicated by the change in state of a signal from the processor 130 and/or the LED driver 142, the LED light bars 142 enter an inactive state (e.g., they turn off or emit light at a very low level). As described below, the processor 130 may adjust the delay period and/or the light levels based on its analysis of logged sensor data.

The lighting fixture 100 also includes a temperature sensor 180, which can optionally be integrated into the occupancy sensing unit 102, along with other sensors, including but not limited to ambient light sensors (e.g., photocells), sensors for tracking radio-frequency identification (RFID) tags, cameras, and even other types of occupancy sensors. These additional sensors (not shown) may be coupled to the processor 130 via one or more digital input/output ports 164 and/or one or more analog input ports 166.

A communications interface 160 coupled to the processor 130 may, optionally, be incorporated into the occupancy sensing unit 102 if desired. The communications interface 160, which is coupled to an antenna 162, provides the occupancy sensing unit 102 with access to a wireless communications network, such as a local area network or the Internet. The occupancy sensing unit 102 may transmit raw or processed occupancy data to other a database, other lighting fixtures, or other occupancy sensing units via the communications interface 160. It may also receive occupancy data, firmware or software updates, predicted environmental data (e.g., temperature and ambient light level data), commissioning information, or any other suitable information from other sources, e.g., other lighting fixtures, occupancy sensing units, or external controllers.

The lighting fixture 100 also includes a real-time clock 170 that can also, optionally, be incorporated into the occupancy sensing unit 102 if desired. The real-time clock 170 provides time-stamp information on as needed or periodic basis to the memory 120 and the processor 130, which may store or tag the occupancy data with time stamps to indicate when the data was collected. The real-time clock 170 may also be used to time or coordinate the sensor/lighting fixture delay period and to synchronize the occupancy sensing unit 102 to other devices, systems, or communications networks.

A hardware power meter 150 coupled to the processor 102 meters alternating-current (AC) power (e.g., 120 VAC at 60 Hz) from an AC power input 156. The hardware power meter 150 provides the processor 130 with metering data representing the amount and rates of power consumption as a function of time. A low-voltage power supply 152 coupled to the power meter 150 transforms the AC power into low-voltage (e.g., 5 V) direct-current (DC) power suitable for running the processor 130 and/or other low-voltage electrical components in the lighting fixture. A high-voltage power supply 154 coupled to the power meter 150 transforms the AC power into high-voltage DC power suitable for running the LED driver 140 and the LED light bars 142. The low-voltage power supply 152 and/or the high-voltage power supply 154 may filter and/or otherwise condition the AC power as desired.

Alternatively, the lighting fixture 100 (and occupancy sensing unit 102) may draw power from an external DC power supply, such as a rechargeable battery. Such an embodiment may include one or more DC-DC power converters coupled to a DC power input and configured to step up or step down the DC power as desired or necessary for proper operation of the electronic components in the lighting fixture 100 (and occupancy sensing unit 102). For instance, the DC-DC power converter(s) may supply DC voltages suitable for logic operations (e.g., 5 VDC) and for powering electronic components (e.g., 12 VDC).

Occupancy Sensors and Sensor Configurations

While the configuration of the facilities in which the occupancy sensor system may be used can be quite varied, there are certain attributes of the functionality of occupancy sensing in warehouses and distribution centers that are based on mounting heights, positions, and angles. Therefore, an occupancy sensor as described herein may work for a variety of installation locations in a warehouse or distribution center including without limitation: racked aisles, ends of aisles, cross-aisles, and open spaces. The occupancy sensor design overcomes limitations found in existing designs which are typically either 360 degrees for open areas, or a long lobe of sensitivity for aisle applications.

To provide 360-degree monitoring and/or enhanced monitoring in certain directions, an occupancy sensor design may include multiple sensors and/or multiple sensing elements, which may be configured in various ways. One example is to align and overlap two or more sensing elements along one axis (e.g., for use in aisles). Another example is to position two or more sensing elements to provide angled fields of view, e.g., fields of view whose optical axes are offset from each other and/or oriented with respect to each other at an angle of about 30 degrees, 45 degrees, 60 degrees, 90 degrees, or any other desired or suitable angle. Various combinations of angled and offset sensing regions, when combined with processing and optimization capabilities provided by an inventive occupancy sensing unit, may provide a desired degree of sensitivity and configurability. An exemplary occupancy sensor design may fulfill the needs of multiple applications with a single embodiment by supporting occupancy sensing within two or more long lobes (e.g., for aisles in a warehouse) and in a 360-degree zone for open environments or where the sensor is approached from multiple directions. Networked control of lights may benefit from the improved sensing resolution of the inventive occupancy sensor to further facilitate operation based on "local control" that facilitates control of multiple lights or lighting fixtures (e.g., in a predetermined zone) by a single occupancy sensing unit (e.g., on a single lighting fixture or disposed remotely).

The lighting fixture 100 or occupancy sensing unit 102 may also include an accelerometer (not shown) coupled to the processor 130 to provide a signal representative of swaying, vibration, or other movement of the occupancy sensor 110. Because the occupancy sensor 110 detects relative motion, swaying or other movement of the occupancy sensor 110 may result in "false positive" detections. The processor 130 may use the signal from the accelerometer to determine the velocity of the occupancy sensor 130 and to compensate for the occupancy sensor's motion when determining and classifying signals from the occupancy sensor 110. If the processor 130 detects that the occupancy sensor's velocity varies periodically, for example, the processor 130 may determine that the occupancy sensor 110 is swaying and subtract the sensor's velocity from the detected velocity of the moving objects in the sensor's field of view. (Alternatively, or in addition, the occupancy sensor mounting may be made more rigid to reduce or prevent swaying.)

Suitable occupancy sensors may provide adjustable sensing areas with one or more sensing elements, including but not limited to passive infrared (PIR) sensing elements, a visible or infrared camera, ultrasonic sensing elements, radio-frequency antennas (e.g., for radar), or combinations thereof (e.g., as in hybrid PIR/ultrasonic devices). The occupancy sensor 110 shown in FIGS. 2A and 2B includes three PIR sensing elements (shown in FIGS. 2A and 2B as sensing elements 112a, 112b, and 112c; collectively, sensing elements 112) arrayed at the respective focal points of respective Fresnel lenses (shown in FIGS. 2A and 2B as lenses 114a, 114b, 114c, and 114d; collectively, lenses 114). Each lens 114 focuses infrared radiation in a particular field of view (shown in FIGS. 2A and 2B as fields of view 116a, 116b, and 116c; collectively, fields of view 116) onto one or more corresponding sensing elements 112.

The sensing elements 112 and lenses 114 can be selected and/or adjusted to ensure that the occupancy sensor's aggregate field of view (i.e., the combination of individual fields of view 116) encompasses certain portions of the illuminated environment. In some cases, the fields of view 116 may be arranged such that the occupancy sensor 100 detects a moving object, such as a person or vehicle (e.g., a forklift), before the moving object enters the illuminated environment. (In these cases, one or more of the fields of view 116 may extend beyond the area illuminated by the lighting fixture 100.) The processor 130 estimates the moving object's velocity and predicts the moving object's trajectory from the occupancy sensor data; if the processor 130 determines the that moving object is going to enter the illuminated area, it turns on the lighting fixture 100 soon enough to provide sufficient illumination for safety purposes. For example, the processor 130 may estimate that the object is a forklift moving at about 25 mph based on the amplitude and variation(s) in occupancy sensor data and turn on the lights about 40-50 seconds before the forklift enters the illuminated area to ensure that the forklift operator can see a distance equal to or greater than the stopping distance of the forklift. If the processor 130 estimates that the object is a person walking at about 5 mph, it may turn the lights on only about 20-30 seconds before the person enters the illuminated area. The processor 130 may also determine how long the lighting fixture 100 remains on based on the object's estimated velocity, e.g., it may reduce the sensor delay for objects moving at higher speeds and increase the sensor delay for objects moving at lower speeds.

In other cases, the sensing elements 112 and lenses 114 may also be arranged to ensure that other portions of the illuminated environment or vicinity do not fall within the aggregate field of view. For instance, fields of view 116 may be arranged during or after installation to prevent a person or vehicle at edge of the illuminated environment or outside the illuminated environment from triggering the occupancy sensor 110 prematurely or inadvertently. Similarly, predictable, consistent occupancy sensing may facilitate reporting of energy usage to a utility provider (e.g., for measurement and verification, or demand response actions, and the like), such as in the case of remotely mounted sensors, or sensors controlling more than one fixture (e.g., through a network). The fields of view 116 may also be adjusted (on a regular basis, if desired) based on traffic patterns, occupancy patterns, energy consumption, and other factors derived from analysis of the occupancy sensor data logged by the occupancy sensing unit 102.

Referring again to FIGS. 2A and 2B, the illustrated occupancy sensor 110 includes two Fresnel lenses 114a and 114b that collect radiation falling within longitudinally oriented fields of view 116a and 116b, respectively, and focus the collected radiation onto sensing elements 112a and 112b, respectively. The illustrated occupancy sensor 110 also includes two Fresnel lenses 114c and 114d that collect infrared radiation falling within transversely oriented fields of view 116c and 116d, respectively, onto a single, centrally positioned sensing element 112c. The fields of view 116, each of which has a roughly conical shape, may be arranged to detect occupancy events along an aisle in a warehouse: the longitudinally oriented fields of view 116a and 116b cover the aisle itself, and the transversely oriented fields of view 116c and 166d cover an intersection in the middle of the aisle. Together, the fields of view 116 enable monitoring occupancy over about 360 degrees in an area close to the sensor (i.e., at the intersection) and along the length of the aisle itself.

The occupancy sensor 110 can be mounted a height of about seven meters to about fourteen meters (e.g., eight meters, ten meters, twelve meters, or any other suitable height) to provide varying amounts of floor coverage. At a mounting height of fourteen meters, for example, the occupancy sensor 110 may have a detection radius of about nine meters; reducing the mounting height to about ten meters reduces the floor detection radius to about seven meters, and at a mounting height of about seven meters, the floor detection radius may be about five meters. Alternatively, the occupancy sensor 110 may have lenses 114 selected and mounted such that the floor detection radius varies more or less gradually with mounting height.

The occupancy sensing unit 102 may be an integral part of a lighting fixture, as shown in FIG. 1, or it can be a modular unit suitable for use with new or existing lighting fixtures, such as LED fixtures, fluorescent fixtures, and/or HID fixtures. In some examples, the occupancy sensing unit may be a kit that can be built and coupled to an existing lighting fixture or installed as a stand-alone module in the vicinity of a new or existing lighting fixture. For instance, exemplary occupancy sensing units may be retrofit to mid-bay and/or high-bay lighting fixtures in a warehouse, cold-storage facility, or other industrial space. When installed properly, occupancy sensing units may be used to reduce energy consumption by the lighting fixtures, optimize facility layout, and/or enhance safety.

The occupancy sensing unit 102 may be configured to detect (and identify) objects moving at speeds of anywhere from walking speed (about 0.6 m/s) to the driving speed of a forklift or similar vehicle (about 10 mph). The occupancy sensor(s) 110 in the occupancy sensing unit 102 may be rotatable, e.g., through at least about 90 degrees and up to about 180 degrees, either by hand, via a remote-controlled actuator, or both by hand or by remote control. The occupancy sensing unit 102 may have an operating temperature of about −40° C. to about +40° C. (or even +50° C.) and a storage temperature of about −40° C. to about +60° C. It may also operate in conditions of about 20% to about 90% humidity.

Processing and Storing Occupancy Sensor Data

As well understood by those of skill in the art, each sensing element 112 in the occupancy sensor 110 produces an analog signal 201, such as a photocurrent, whose magnitude is directly proportional to the strength of detected radiation. Depending on the sensor design, the analog signals 201 from the sensing elements 112 are either processed separately or multiplexed together to form a single analog output. Alternatively, the signals may be multiplexed together after they have been digitized.

Figure 2A:
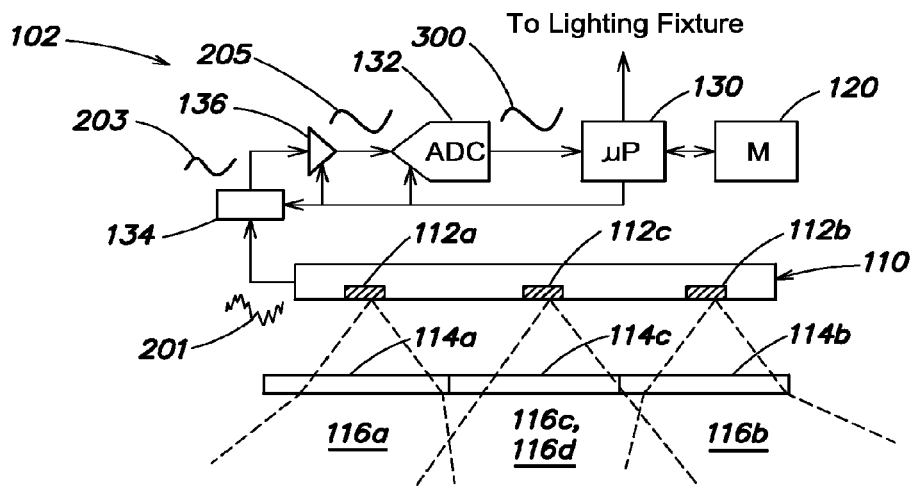
FIGS. 2A and 2B are, respectively, elevation and plan views of an occupancy sensing unit with an adjustable field of view (radiation pattern), according to embodiments of the present invention.
Figure 2B:
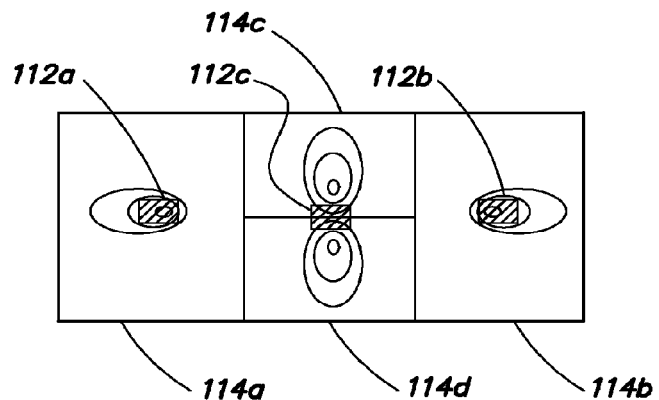

In the example shown in FIG. 2A, the analog signals 201 are transmitted through a filter 134, such as a bandpass or lowpass filter, coupled to the output of occupancy sensor 110 to produce filtered analog signals 203. As understood by those of skill in the art, the filter 134 removes noise and other undesired signals at bands outside a passband or above or below cutoff frequency. In some embodiments, the processor 130 may tune the passband width, center frequency, or cutoff frequency of the filter 134 based on an analysis of logged occupancy sensor data. An amplifier 136 coupled to the output of the filter 134 amplifies the filtered analog signals 203 by a gain, which can be varied by the processor 130 based on an analysis of logged occupancy sensor data, to produce an amplified signal 205. A multi-bit ADC 132 coupled to the output of the amplifier 136 converts the amplified analog signal 205 into one or more multi-bit digital signals 300 (e.g., 16-bit, 32-bit, or 64-bit digital signals) whose amplitudes represent the strength of the detected radiation. The processor 130 may control the offset, sample period, and bit levels of the ADC 132 based on analysis of logged occupancy sensor data. Those of skill in the art will readily appreciate that alternative occupancy sensing units may include other components or arrangements of components to generate one or more digital signals representative of detected occupancy events.

Figure 3:
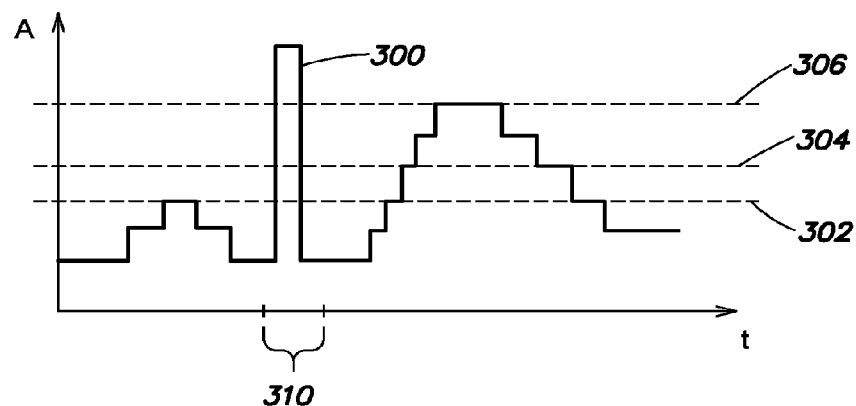
FIG. 3 is a plot of a digital signal generated by the occupancy sensing unit of FIGS. 2A and 2B, according to an embodiment of the present invention.

FIG. 3 is a plot of an exemplary digital signal 300 from an occupancy sensing unit 102 that illustrates how the processor 130 uses amplitude and duration thresholds to classify signals from the occupancy sensor 110. As explained in greater detail below, the thresholds (and associated responses) may be adjusted based on analysis of logged sensor data. In some embodiments, the processor 130 compares the amplitude(s) of the digital signal(s) 300 (e.g., with one or more comparators) to one or more thresholds (e.g., represented by reference levels) that represent different types and/or different numbers of occupants. For instance, the processor 130 may ignore signals whose amplitudes are below a low threshold 302 representing a noise floor. The processor 130 may determine that a signal 300 whose amplitude falls between the low threshold 302 and an intermediate threshold 304 represents a person who has just entered the sensor's field of view 116 and turn on one or more of the LED light bars 142 in the lighting fixture 100. If the processor 130 determines that the signal amplitude exceeds a high threshold 306, the processor 130 may determine that a vehicle has entered or is about to enter the illuminated area and turn on all of the LED light bars 142 in the fixture. Although FIG. 3 depicts only low, intermediate, and high thresholds, those of skill in the art will readily appreciate that the processor 130 may compare the digital signal 300 to more or fewer thresholds as desired.

The processor 130 can also measure how long the amplitude of the digital signal 300 exceeds any one of the thresholds and use this measurement as a classification criterion. For instance, if the digital signal 300 exceeds a given threshold only briefly (i.e., for less than a minimum duration 310), the processor 130 may discard the data point as spurious. The processor 130 may also compute the average signal amplitude over a given window and/or the rate of change in signal strength (i.e., the derivative of the signal amplitude with respect to time); if the signal amplitude changes too quickly or too slowly to represent an occupancy event, then the processor 130 may discard or ignore the data.

The processor 130 may also learn and identify patterns in the digital signals 300 that represent particular types of occupancy events. For example, in cases where each sensing element 112 provides a separate digital signal 300, the digital signals 300 from each sensing element may successively increase, then decrease, as a moving object passes through the fields of view 116. The processor 130 determines the object's direction of movement from the order in which the digital signals 300 change; it determines the object's speed from how quickly the digital signals 300 change, either by taking the derivative of each signal individually, by estimating the object's change in position over time from the peaks in the different signals, or both. The processor 130 uses its estimate of object velocity to turn on lights in the object's predicted path and to turn off lights shortly after the object's predicted departure from the illuminated area (rather than simply turning off the lights after a fixed timeout period).

The processor 130 may also set or vary the light levels for different types of occupancy events. For instance, the processor 130 may turn on all the lights to 100% illumination when it detects a moving vehicle. It may also turn on these lights gradually, especially at night, to avoid blinding the vehicle's driver. In other examples, the processor 130 may turn on lights to relatively low levels (e.g., 30%) at night to preserve a person's night vision.

The processor 130 also logs representations of the digital signals 300 in the memory 120. These representations, or historical occupancy sensor data, may be stored in a raw format, as processed data (e.g., with time stamps from the real-time clock 170 or other timing device), or both. The processor 130 may also log representations of its responses to occupancy signals 300 (e.g., data representing commands such as "turn on light bars 1 and 2 at 50% of maximum amplitude for five minutes") as well as data about the occupancy sensing unit 102 and lighting fixture 100 including, but not limited to: gain, offset, and threshold values of the occupancy sensor 110; the age, operating status, power consumption rates, of the system components and the system itself; etc. The memory 120 may store data from other sensors, including, but not limited to data concerning temperature, time (including hour, day, and month), ambient light levels, humidity, etc.

Analyzing Logged Occupancy Sensor Data

Figure 4:
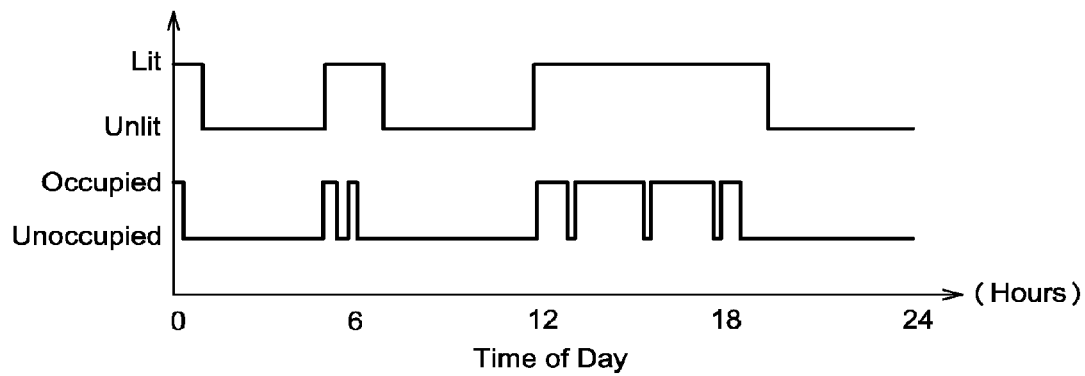
FIG. 4 is a plot that illustrates the occupancy state and lit state of a notional illuminated environment.

As stated above, the memory 120 in the occupancy sensing unit 102 may store a variety of data, including the two types of raw data shown in FIG. 4: data representing the occupancy state (i.e., "occupied" or "unoccupied") of an illuminated environment as well as the status of the lighting fixture (i.e., "lit" or "unlit") over a single day. In this example, both the occupancy state and the environment status are binary, i.e., either on or off. In other examples, the occupancy sensor data may be in a "raw" format, e.g., as shown in FIG. 3. Alternatively, the occupancy sensor data may be processed to indicate a particular type of occupancy event. Similarly, the lighting fixture data may indicate the number of lights that are on and/or the dimming level of each light.

Even the simple, binary case illustrated in FIG. 4 shows that the light is on when the illuminated environment is unoccupied. Suppose that the illuminated environment is a break room with the lighting fixture 100 of FIG. 1 in an office or warehouse that is open during the day and patrolled by security guards at night. Workers come into the break room in the morning, starting at 6 am, to get coffee or relax briefly before starting to work. The break room is occupied nearly continuously between about noon and 6 pm as the workers take lunch breaks and coffee breaks. A security guard may step in briefly at midnight. An occupancy sensor 110 detects an occupancy event every time person enters the break room, as indicated by the transition from an "unoccupied" state to an "occupied" state in the lower curve in FIG. 4. Upon sensing a transition from unoccupied to occupied status, the occupancy sensing unit 102 turns on the light bars 142, as indicated by the transition from an "unlit" state to a "lit" state in the upper curve in FIG. 4, which remain on for a predetermined timeout period.

FIG. 4 shows that the break room remains lit and occupied nearly continuously between about noon and 6 pm. FIG. 4 also shows that the timeout period for the light bars 142 is longer than it needs to be for occupancy events between 6 pm and 6 am: the fixture remains lit for many minutes after the room becomes unoccupied. Similarly, the timeout period for the light bars 142 is longer than necessary between about 6 am and noon. As a result, the lighting fixture 142 consumes more energy than necessary between 6 pm and noon. This extra "on" time also causes the light sources (e.g., LEDs) in the light bars 142 to age more quickly.

Placing the raw data plotted in FIG. 4 in TABLES 1-3 (below) shows that the light bars 142 in the break room are on for 2.8 hours longer than necessary. As a result, the light bars 142 consume about 34% more energy than if they were on only when the room was occupied. Reducing the timeout period would reduce the excess "on" time and the amount of extra energy consumed by the lighting fixture.

The raw data also show that the status of the illuminated environment is never "off and occupied," which indicates that the occupancy sensing unit 102 is not experiencing "false negatives," i.e., the occupancy sensing unit 102 has not detected every occupancy event that occurred in the twenty-four-hour period under examination. If the status of the illuminated space is ever "off and occupied," indicating that the occupancy sensing unit 102 had failed to detect or respond to an occupancy event (or had been overridden), then the processor 130 may adjust the occupancy sensor settings to lower detection thresholds (e.g., decrease threshold 302 in FIG. 3) and/or change responses to detected occupancy events (e.g., change the dimming level). Similarly, the processor 130 may increase detection thresholds if it determines that there are too many "false positives," i.e., the occupancy sensing unit 102 transmits a signal representative of an occupancy event when no occupancy event has taken place.

TABLE 1

| Lighting Data | | |
|---|---|---|
| Lighting Metric | Time (Hours) | Time (Percentage) |
| Total On Time | 11.0 | 45.8 |
| Average On Period | 3.7 | 15.3 |
| Short On Period | 1.0 | 4.2 |
| Longest On Period | 8.0 | 33.3 |
| Total On/Off Cycles | 3 | |
| Average On/Off Cycles/Day | 3.1 | |

TABLE 2

Occupancy Data

| Occupancy Metric | Time (Hours) | Time (Percentage) |
| --- | --- | --- |
| Total Occupancy Time | 8.2 | 34.1 |
| Average Occupancy Period | 1.2 | 5.0 |
| Short Occupancy Period | 0.1 | 0.4 |
| Longest Occupancy Period | 2.3 | 9.6 |
| Total Occupancy Cycles | 7 | |
| Average Occupancy Cycles/Day | 7.6 | |

TABLE 3

Illuminated Environment Status

| Environment Status | Time (Hours) | Time (Percentage) |
| --- | --- | --- |
| On and Occupied | 8.2 | 34.1 |
| On and Vacant | 2.8 | 11.7 |
| Off and Occupied | 0.0 | 0.0 |
| Off and Vacant | 15.8 | 65.8 |

FIG. 4 and TABLES 1-3 represent a coarse level of analysis of only a single day's worth of data. Collecting data for longer periods (e.g., weeks, months, or years) enable more sophisticated analysis and more sophisticated control of inventive lighting fixtures. For instance, the plot in FIG. 4 suggests that the occupancy pattern in the illuminated space changes over the course of the day. Although useful, FIG. 4 and TABLES 1-3 do not present a complete picture of the occupancy patterns associated with the illuminated space.

Figure 5:
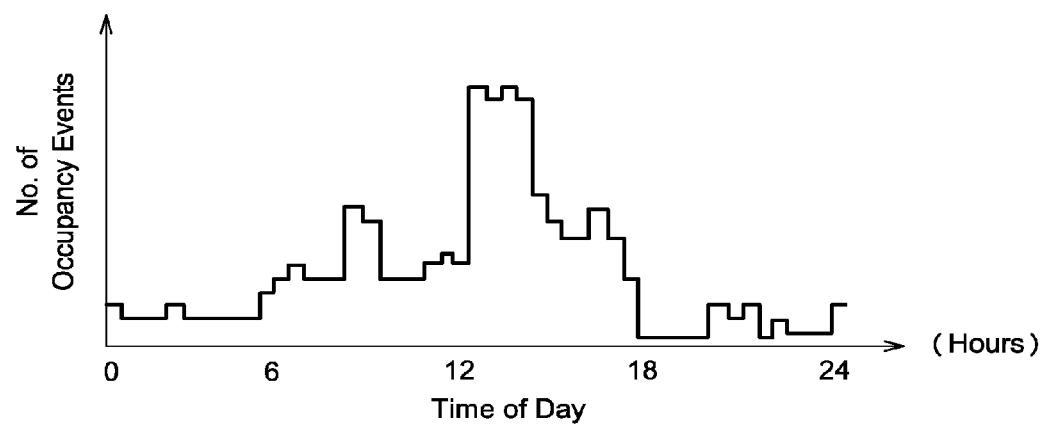
FIG. 5 is a histogram of the number of occupancy events for the notional illuminated environment of FIG. 4 over a single day.

Analyzing an extended data as a function of time and/or frequency yields a more complete picture of the occupancy patterns associated with a particular illuminated environment. For instance, FIG. 5 shows a histogram of the total number of occupancy events at a particular time of day for an extended period of time (e.g., four weeks). The histogram suggests that occupancy events occur most frequently between noon and 2 pm (lunch time) with substantial occupancy activity extending from about 6 am until about 6 pm (a twelve-hour work day). Occupancy events occur sporadically between about 6 pm and about 6 am, with slight peaks at about 8 pm and midnight.

The processor 130 may use the occupancy pattern(s) revealed by a frequency distribution of occupancy events, such as the histogram shown in FIG. 5, to determine a timeout period that varies with the time of day. In this example, the processor 130 may set different timeout periods for the light bars 142 for different times of day: a relatively short timeout period between 6 pm and 6 am, when the illuminated environment is only briefly occupied, and a longer timeout period between 6 am and 6 pm, when the illuminated environment is occupied for longer periods of time. In addition, the processor 130 may also adjust the lighting levels for the active state, inactive state, and even set a third lighting level for an intermediate state corresponding to the sensor delay period.

Figure 6A:
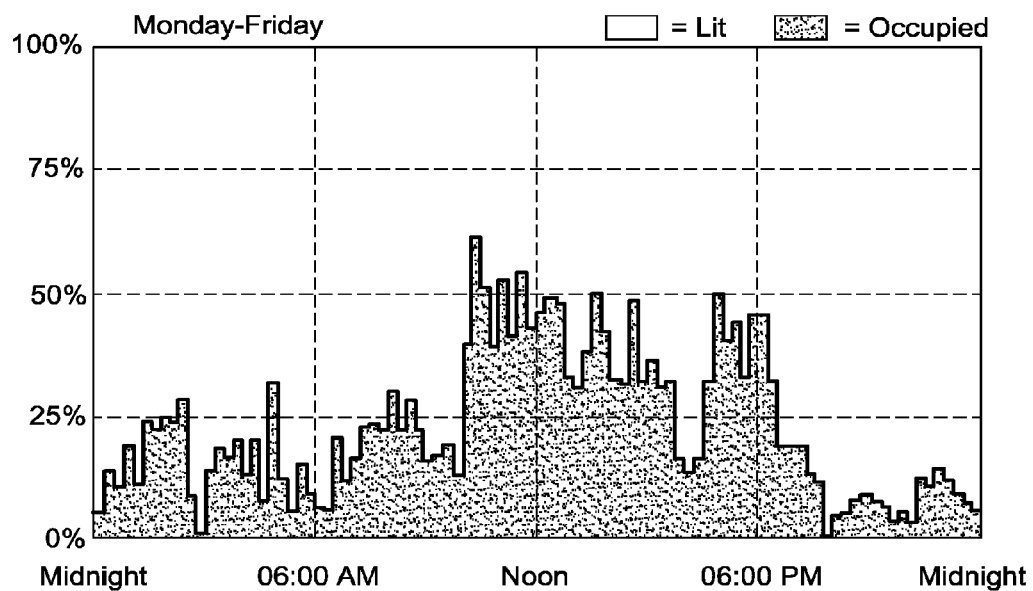
FIGS. 6A and 6B are histograms that illustrate occupancy profiles for a given illuminated environment on weekdays (FIG. 6A) and weekends (FIG. 6B).
Figure 6B:
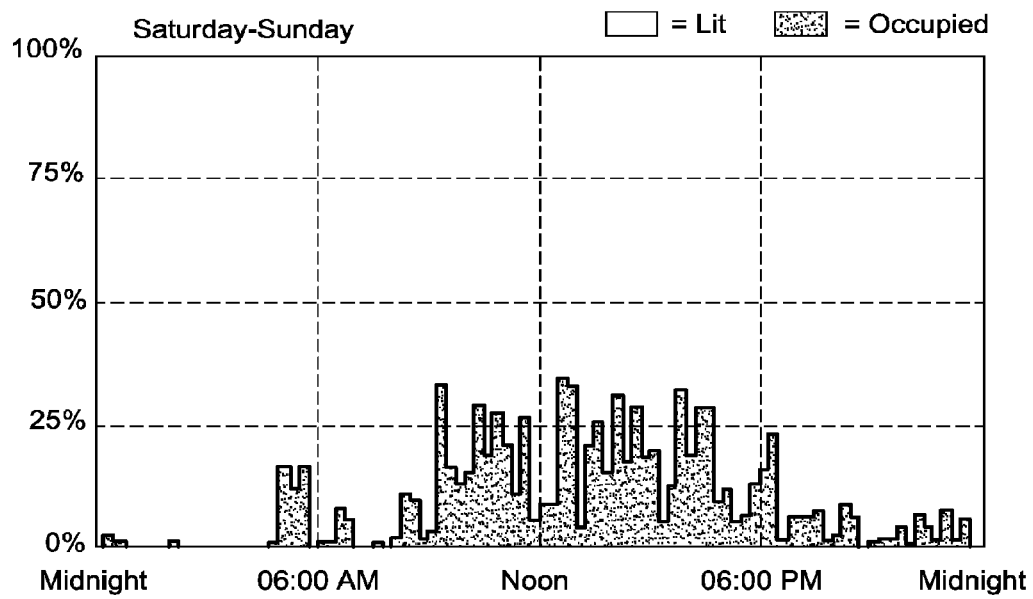

FIGS. 6A-6D show how occupancy and lighting patterns for an illuminated space change on time scales of one week or more. FIGS. 6A and 6B are histograms of the number of occupancy events versus time of day for a single illuminated environment during weekdays (FIG. 6A) and weekends (FIG. 6B). The histograms indicate that the frequency and number of occupancy events is highest during working hours (i.e., 8 am to 5 pm) during weekdays and weekends, but the total number of occupancy events is dramatically lower during weekends than during weekdays. In addition, FIG. 6B shows that the occupancy sensor 110 detects hardly any occupancy events between midnight and 6 am on the weekends.

Figure 6C:
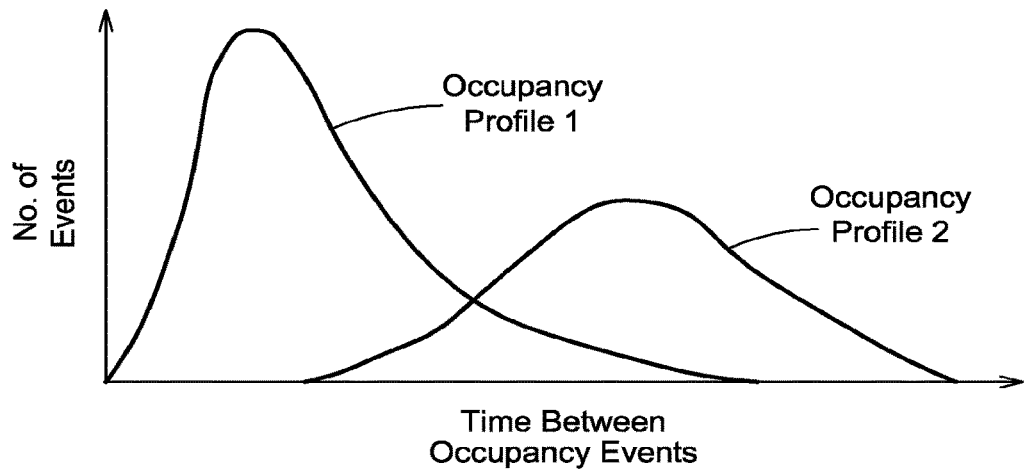
FIG. 6C is a plot of the number of occupancy events versus the time between occupancy events for two different occupancy patterns.

The processor 130 in the occupancy sensing unit 102 may identify and use patterns shown in the histograms of FIGS. 6A and 6B to define two different occupancy profiles for the illuminated environment: a first profile that applies on weekdays and a second profile that applies on weekends. Each profile may be linked to or include an expected occupancy pattern, a specific set of sensor parameters (gain, threshold, offset, timeout), and a specific set of responses to particular types of occupancy events. The processor 130 may adjust parameters and/or responses associated with each profile so as to reduce or minimize energy consumption of the lighting fixture 100 for the associated occupancy pattern. In this case, for example, FIG. 6C shows that occupancy events tend to occur more frequently on weekdays (the first profile) than on weekends (the second profile).

Figure 6D:
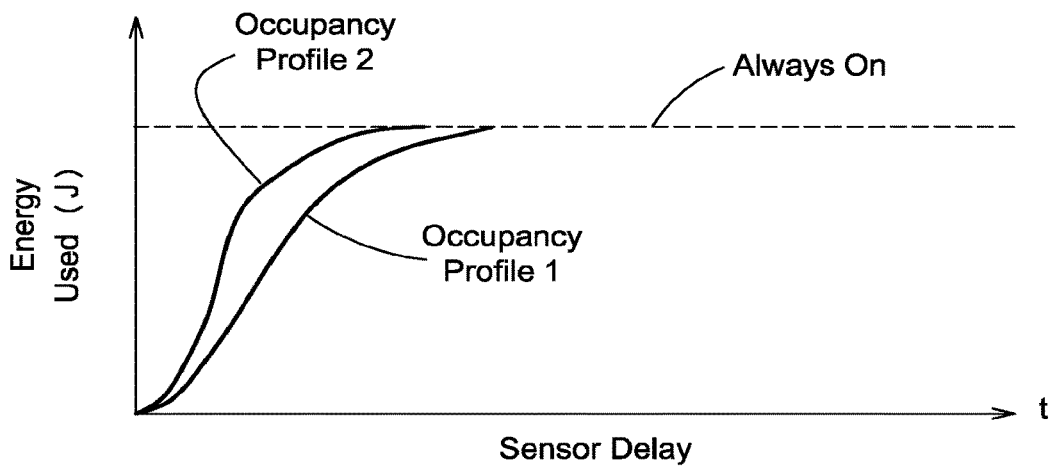
FIG. 6D is a plot of energy consumed by a lighting fixture versus sensor delay for two different occupancy profiles.

FIG. 6D, which is a plot of consumed energy versus sensor delay for the first and second occupancy profiles (as well as for having the lights on all the time), shows that the difference in occupancy event frequencies for the first and second occupancy profiles has a profound effect on the amount of energy consumed to illuminate the same space. In this case, the relatively frequent occurrence of occupancy events for the first occupancy profile causes energy consumption to increase as a function of sensor delay. Energy consumption for the second occupancy profile also increases as a function of sensor delay, but more quickly because occupancy events occur less frequently for the second occupancy profile compared to the first occupancy profile.

Adjusting Sensor Detection Parameters Based on Stored Occupancy Sensor Data

Illustrative occupancy sensing units may further benefit warehouse and other LED light applications by learning occupancy patterns so as to adjust the occupancy sensors and/or light fixtures. For example, learned occupancy patterns based on detected occupancy events (e.g., coming and going) may provide some indication of a behavioral signature for certain individuals or objects entering an occupancy sensing area. Certain times of the work day may be found to have higher occupancy activity in certain areas of the facility. Lights in those areas, and perhaps leading up to those areas, may be kept on longer once an occupancy event has been detected during more active times of day.

When mixed occupancy events (e.g., a moving electric forklift and a walking human) are detected in adjacent or nearby areas, the processor 130 may apply certain operational rules, such as safety rules, when processing occupancy sensor data so that additional or key safety areas (e.g., ends of aisles) are well lit. In addition, different types of warehouse activities may benefit from different lighting. Occupancy detection may provide an indication as to the type of activity based on the dwell time of an occupant in a region. Someone performing an audit or inventory count may tend to stay in a particular area of the inventory aisles for longer periods of time than for someone simply picking a part.

The occupancy sensing unit 102 may include hardware, firmware, and/or software that controls the gain, offset, threshold, polling frequency, and/or polling duty cycle of each sensing element 112 in the occupancy sensor 110. For instance, each sensing element 112 may be coupled to an individually tunable occupancy sensor circuit that controls the operating mode (on, off, standby, etc.), gain, sensitivity, delay, hysteresis, etc., of the sensing element 112. Such a circuit may be tuned locally by the processor 130 or over a network for different illuminated environments. For instance, the sensor 110 or individual sensing elements 112 may be tuned for the differences between humans and fork trucks based on temperature signatures, velocities, field of view orientations, ambient light levels (e.g., due to proximity to a window), etc. mined from stored sensor data.

The occupancy sensing unit 102 may include hardware, firmware, and/or software that controls the sensing parameters (e.g., gain, offset, threshold, polling frequency, and/or polling duty cycle) of each sensing element 112 in the occupancy sensor 110. For instance, each sensing element 112 may be coupled to an individually tunable occupancy sensor circuit that controls the operating mode (on, off, standby, etc.), gain, sensitivity, delay, hysteresis, etc., of the sensing element 112. Such a circuit may be tuned locally by the processor 130 or over a network for different illuminated environments. For instance, the sensor 110 or individual sensing elements 112 may be tuned for the differences between humans and fork trucks based on temperature signatures, velocities, field of view orientations, ambient light levels (e.g., due to proximity to a window), etc. mined from stored sensor data.

Figure 7:
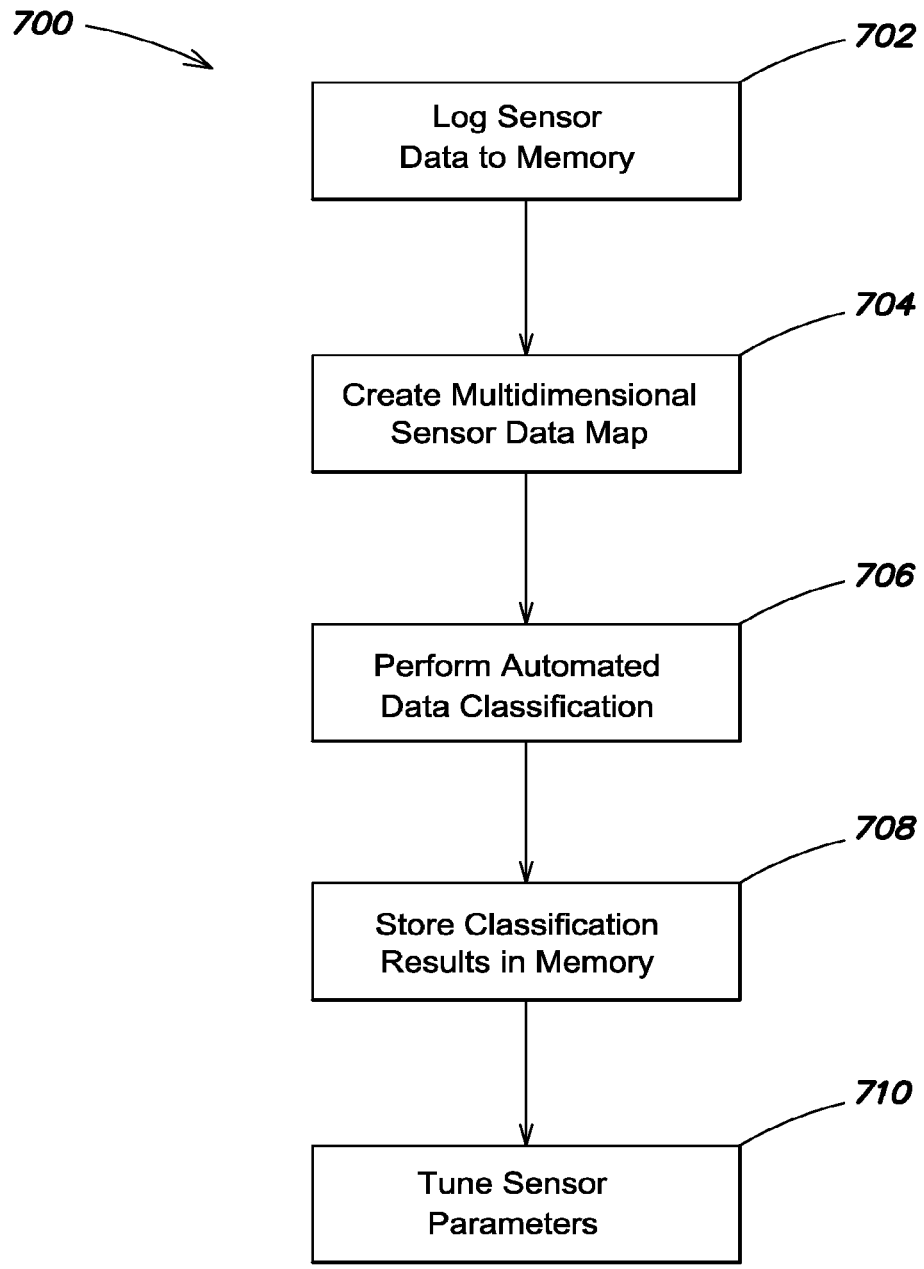
FIG. 7 is a flow diagram that illustrates how an occupancy sensing unit adjusts gain, offset, and/or threshold parameters in real-time by analyzing logged sensor data, according to embodiments of the present invention.

FIG. 7 is a flowchart that illustrates a first process 700 for converting raw analog occupancy sensor data (from a PIR occupancy sensor, for example) to a digital output indicating an "occupied" state or an "unoccupied" state (or finer-grained output, e.g., "unoccupied" vs. "person" vs. "forklift"). Conventional occupancy sensors have gain, offset, and threshold parameters that are hard-coded in hardware (e.g., as resistors) or hard-coded in firmware. They do not enable user adjustment. At most, the raw signal from a conventional sensor is scaled with a gain and/or shifted by an offset, then compared to a threshold to determine whether or not an occupancy event has occurred. Because the gain, offset, and threshold are fixed when a conventional occupancy sensor is built, the conventional occupancy sensor cannot be adapted to fit changing (or variable) sensor conditions. As a result, a conventional occupancy sensor is likely to suffer from false positives or false negatives when used across a wide range of real-world environments.

Conversely, the sensor operation illustrated in FIG. 7 enables adaptive responses to changing occupancy patterns through real-time adjustment of gain, offset, and threshold parameters based on an analysis of past sensor values. In block 702, raw occupancy sensor data is logged to memory at regular intervals, e.g., once per second, based on a timing signal from a real-time clock, counter, or other time-keeping device. Next, in block 704, the processor coupled to the memory creates a multidimensional array or "map" of sensor readings that show, for instance, the frequency, amplitude, duration, and/or rate of change of the raw occupancy data. If desired, the processor may create or update the map once per clock cycle, i.e., every time new data is logged to memory. The processor then processes the map in block 706, e.g., using automated data classification techniques to "partition" the map of sensor readings into clusters corresponding to a particular output state (such as "person," "forklift," "empty," etc.). The processor then stores the classification results back into memory in block 708 for use in setting the lighting fixture and future analysis of lighting system performance. The processor also determines new gain, offset, and threshold parameters based on the classification results tunes the occupancy sensing unit's gain, offset, and threshold parameters accordingly in block 710.

In some embodiments, the automated data classification techniques performed by the processor may include "cluster analysis," which is the assignment of a set of objects into groups (called clusters) based on common characteristics. Objects in a particular cluster tend to be more similar (in some sense or another) to each other than to objects in other clusters. One example of basic cluster analysis involves creating a scatter plot of detected occupancy events versus two mutually exclusive parameters, such as time of day and estimated object velocity, then dividing the points on the scatter plot into clusters. For instance, the points can be grouped based on their mean distance from each other or from a "centroid," or central vector. Alternatively, points can be grouped into clusters using distribution models, density models, or subspace models as understood in the art. The processor may infer occupancy patterns and behaviors from the size, location (with respect to the parameters), and number of elements in a particular cluster. Other suitable automated data classification techniques include, but are not limited to: machine learning, pattern recognition, image analysis, information retrieval, and data mining.

Figure 8:
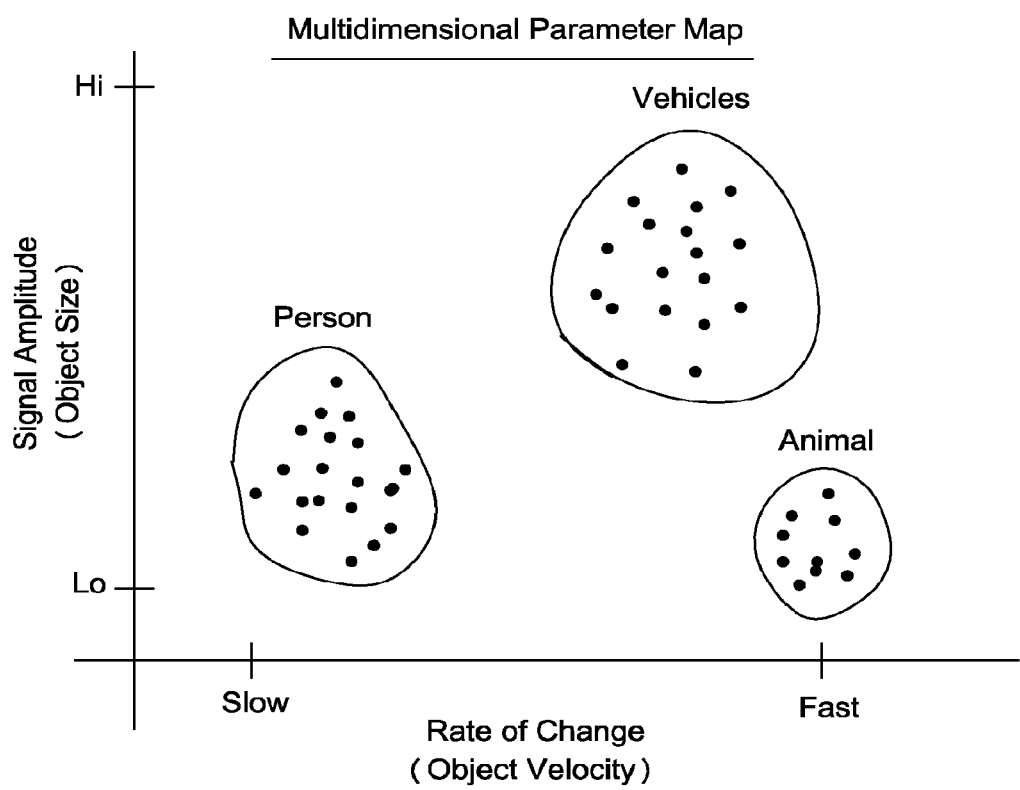
FIG. 8 illustrates a notional two-dimensional parameter map, according to one embodiment of the present invention.

FIG. 8 is a two-dimensional parameter map generated from a notional set of occupancy sensor data. Each point represents a detected occupancy event as function two parameters: rate of change (x axis), which correlates with object speed, and signal amplitude (y axis), which correlates with object size. The points form clusters that can be grouped together, e.g., based on a maximum distance from a center of mass for each cluster. The clusters can then be classified based on their respective ranges for each combination of parameters. In this case, medium-sized, slow-moving objects are taken to be people; large, fast-moving objects are taken to be vehicles; and small, fast-moving objects are taken to be animals.

After the processor 130 (or a user) has classified each cluster, the processor 130 (or user) may estimate the mean, median, and range of parameters associated with each particular class of object. For instance, the processor 130 may determine that people move at a rates of 0.1 m/s to 0.6 m/s with a mean speed of 0.4 m/s. Given knowledge of the size of the illuminated area, the processor 130 may adjust the sensor timeout or the lighting fixture timeout to match or exceed a person's mean (or maximum) travel time through the illuminated environment.

Adding additional parameters to the parameter space further enhances the processor's ability to tailor the lighting and to reduce energy consumption. For instance, the processor 130 may also infer the most common trajectory through the illuminated area by computing which occupancy sensor(s) detected the plotted occupancy events. It may also determine that different types of objects take different paths. For instance, a multidimensional parameter map with the parameters direction, speed, and size may show that vehicles may travel down a central aisle, whereas people may travel along narrower aisles branching off the central aisle. All of the classifications can be used to tune the sensor detection and response parameters, including timeout, gain, offset, and threshold.

Adjusting Sensor Delay Based on Analysis of Stored Occupancy Sensor Data

Inventive occupancy sensing units are also capable of determining an optimal value of the sensor delay and adjusting the sensor delay accordingly. If the sensor delay is too long, then the lighting fixture remains on unnecessarily, wasting energy; if the sensor delay is too short, then the lighting fixture turns off too soon (i.e., when the illuminated environment is still occupied), which impairs safety, productivity, and comfort. In a conventional occupancy sensor, the sensor delay parameter is hard-coded into the sensor via a DIP switch, button, or other manual interface. Changing the sensor delay of a conventional sensor requires manually actuating the switch on sensor, which can be difficult, dangerous, and time-consuming for a sensor mounted on a high-bay lighting fixture fourteen feet above the ground. In addition, even if the sensor delay can be changed, there is no way to determine an "optimal" sensor delay setting for a conventional sensor because the conventional sensor does not record or analyze historical data.

Figure 9A:
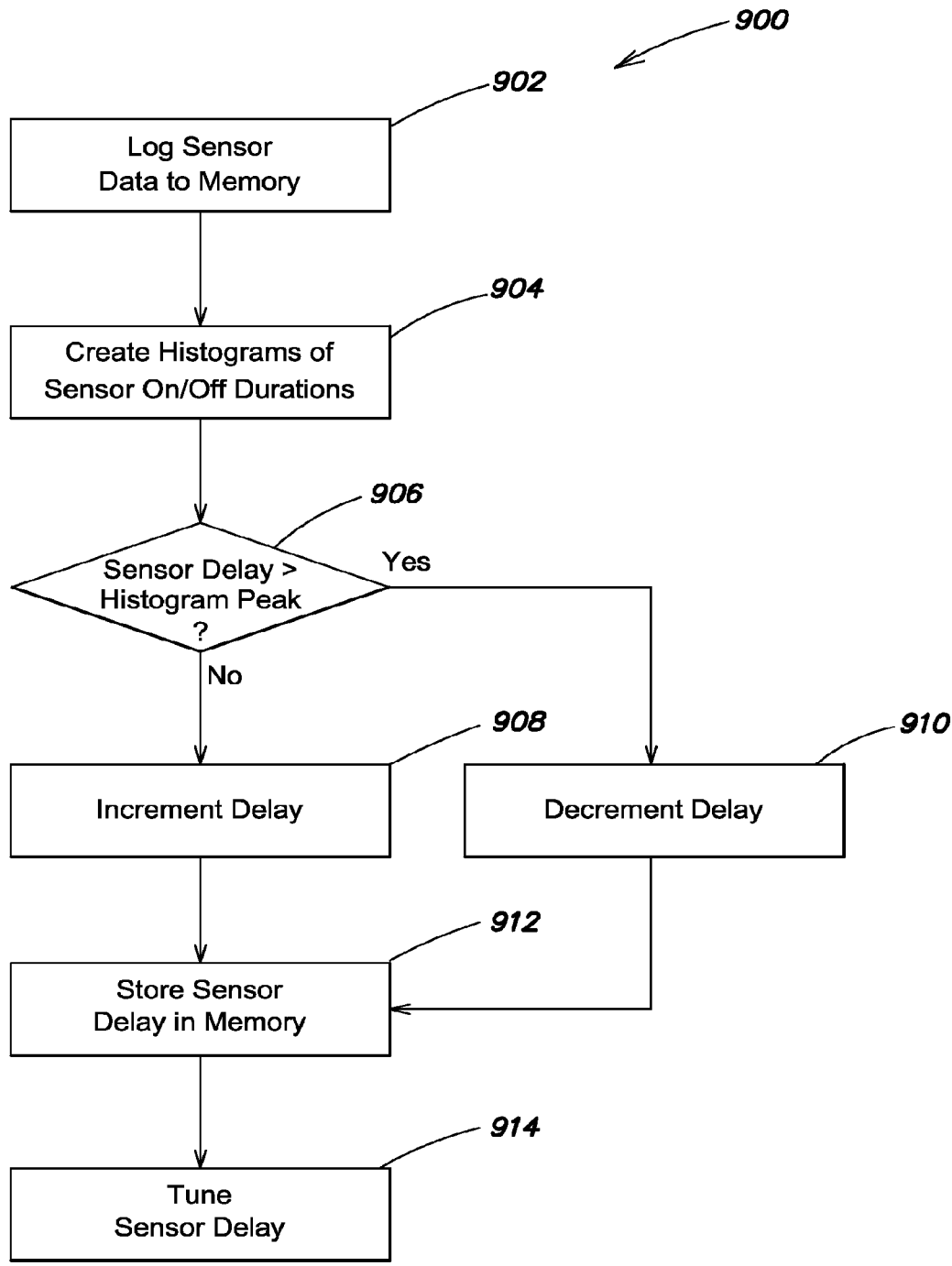
FIGS. 9A and 9B are flow diagrams that illustrate how an occupancy sensing unit adjusts timeout parameters in real-time by analyzing logged sensor data, according to embodiments of the present invention.
Figure 9B:
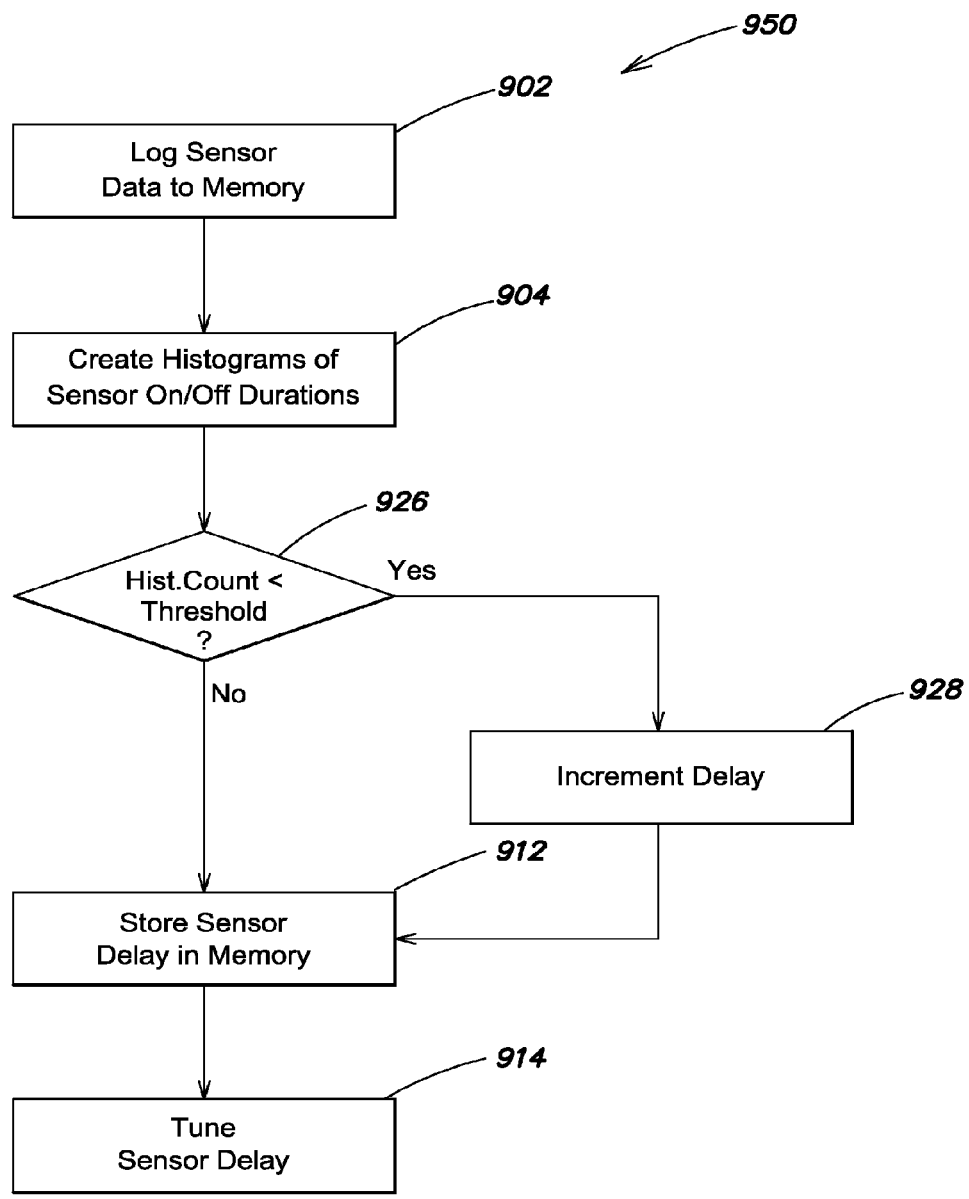

In one example, an inventive occupancy sensing unit has an adjustable sensor delay ("timeouts") that can be adjusted by the processor in the occupancy sensing unit according to the processes 900 and 950 shown in FIGS. 9A and 9B, respectively. Each sensor delay adjustment operation begins in block 902 with logging time-stamped occupancy sensor data to a memory in the occupancy sensing unit and/or to a remote memory (e.g., a memory connected to the occupancy sensing unit via the Internet or another communications network). The data logging may occur at regular intervals, e.g., once per second, as determined by a real-time clock, counter, network clock signal, or other time-keeping device. In block 904, the logged occupancy data sensor data is used to create or update histograms of "sensor on" and "sensor off" durations, e.g., as shown in FIGS. 5, 6A, and 6B.

Next, the processor adjusts the sensor parameters based on the histograms created or updated in block 904. In process 900, shown in FIG. 9A, the processor compares the sensor delay to a histogram peak in block 906. When set properly, the sensor delay matches the histogram peak, and no adjustment is necessary. If the sensor delay is less than the histogram peak, the processor increments the sensor delay by a predetermined amount, e.g., thirty seconds, one minute, five minutes, or ten minutes, in block 908. If the sensor delay is greater than the histogram peak, the processor decrements the sensor delay by a predetermined amount, e.g., thirty seconds, one minute, five minutes, or ten minutes, in block 910. In process 950, shown in FIG. 9B, sensor delay adjustment involves determining how many "sensor off" ("sensor on") occurrences occur below (above) a predetermined threshold number of occurrences in block 926. If the number of "sensor off" ("sensor on") occurrences is below the threshold, the processor increments (decrements) the sensor delay by a predetermined amount, e.g., thirty seconds, one minute, five minutes, or ten minutes, in block 928. If desired, the processor may average or otherwise combine the results of the sensor delay determination techniques of both process 900 and process 950. Once the processor has incremented or decremented the sensor delay, it stores the sensor delay in memory, in block 912, and tunes the sensor delay accordingly, in block 914.

Cooperative Occupancy Sensing

Figure 10A:
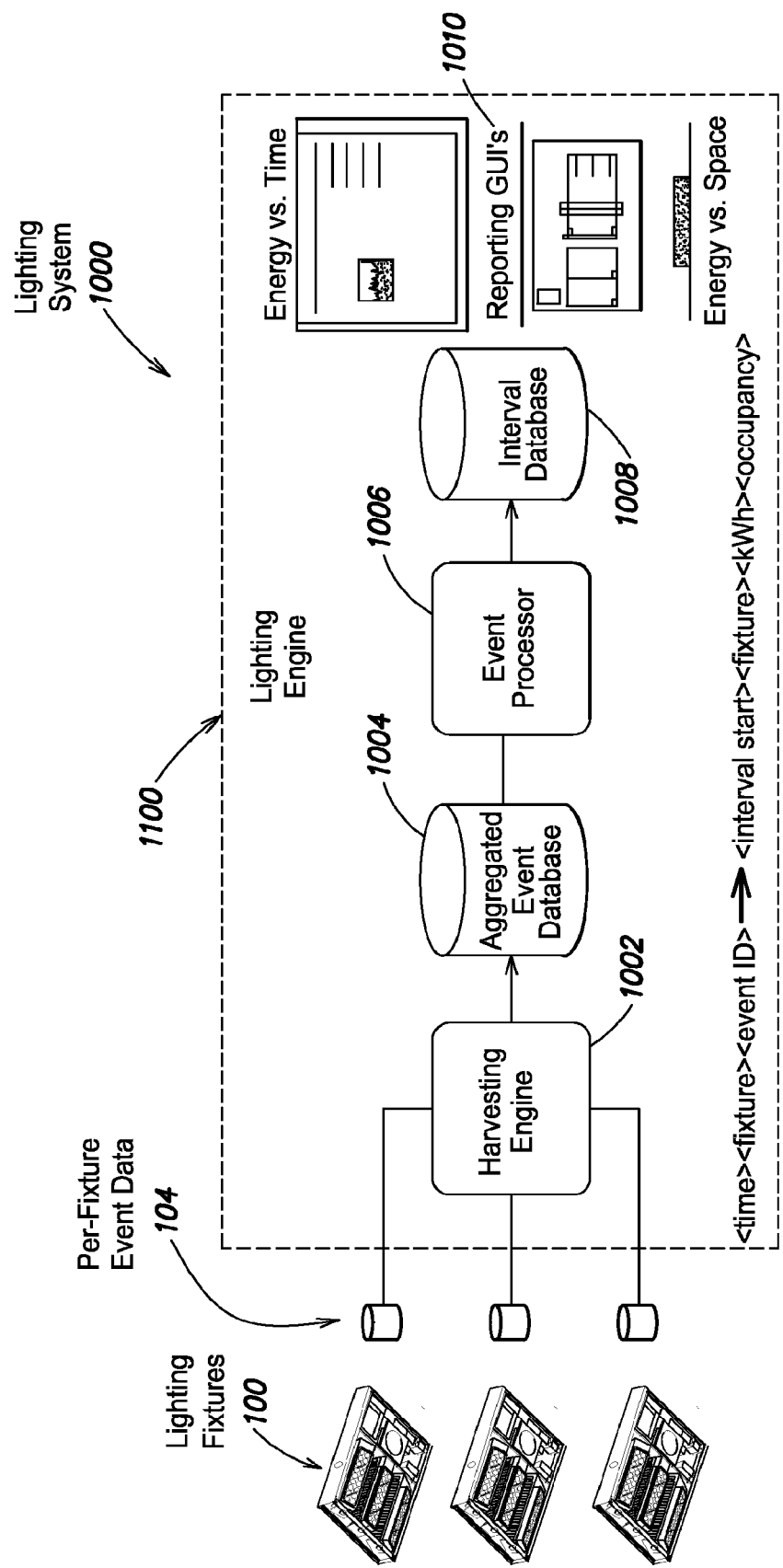
FIG. 10A is a block diagram of a lighting system that employs multiple lighting fixtures and/or occupancy sensing units to provide variable occupancy-based lighting, according to embodiments of the present invention.
Figure 10B:
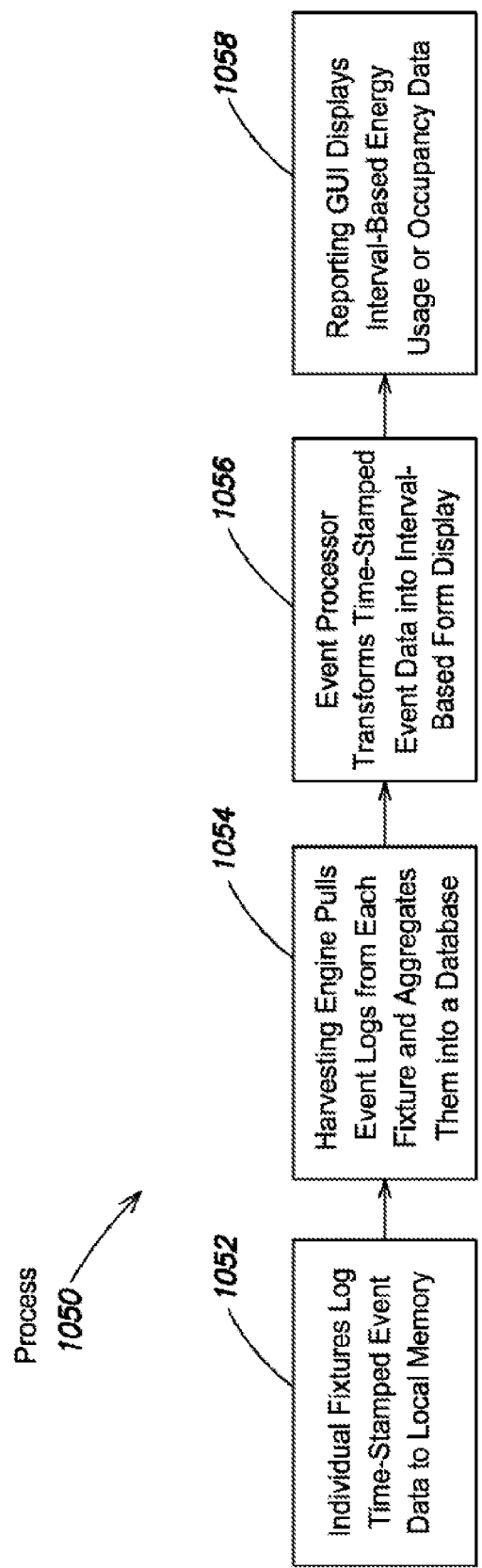
FIG. 10B is a flow diagram that illustrates operation of the lighting system of FIG. 10A, according to embodiments of the present invention.

FIGS. 10A and 10B show how inventive lighting fixtures 100 and occupancy sensing units 102 can be used together with a lighting engine 1100 as part of a lighting system 1000 to determine and provide more sophisticated detection, identification, and analysis of occupancy patterns in illuminated environments. A set of lighting fixtures 100 that each include an occupancy sensing unit 102 provide variable, occupancy-based illumination for a particular environment, such a warehouse, commercial space, or government facility. Each occupancy sensing unit 102 collects, stores, and analyzes time-stamped occupancy sensing data 104 as described above and as in block 1052 of process 1050. The lighting fixtures 100 are exchange information with each other and with the lighting engine 1100 via their respective communication interfaces.

The lighting engine 1100 includes a harvesting engine 1002, which may be implemented in a general-purpose computer processor or as an application-specific processor, that is communicatively coupled to each occupancy sensing unit 102 via a communications network, such as a radio-frequency wireless communications network, an infrared communications network, or a wire- or optical fiber-based communications network. The harvesting engine 1002 retrieves time-stamped occupancy sensing data 104 from the local memory 120 in each occupancy sensing unit 102 on a periodic or as-needed basis as in block 1054 of FIG. 10B. Alternatively, each occupancy sensing unit 102 may transmit its respective occupancy sensing data 104 to a central harvesting engine 1002. The harvesting engine aggregates the retrieved or transmitted data 104 in an aggregated occupancy event database 1004, which can be implemented in any type of suitable nonvolatile memory. The data in the database 100 may include, but is not limited to a time stamp, a fixture, and an event identification code or tag.

The lighting engine 1100 also includes an event processor 1006 coupled to the event database 1004. Like the harvesting engine 1002, the event processor 1006 can be implemented in a general-purpose computer processor or as an application-specific processor. The event processor 1006 transforms the time-stamped data in the aggregated event database 1004 into an interval-based form display as in block 1058 of FIG. 10B. The interval-based form display can be presented to a user via a reporting graphical user interface (GUI) 1010 that shows occupancy data per fixture or zone, traffic between fixtures or within lighting zones, current and historical sensor and fixture parameters, and energy usage per fixture or zone as a function of time and/or space.

The lighting engine 1100 and lighting fixtures 100 (and possibly separate occupancy sensing units 102) are commissioned and connected to each other to form a wireless network (i.e., the lighting system 1000). In one example, occupancy sensing units 102 are installed on existing high-bay lighting fixtures 102 in a cold-storage facility and connected to a power supply, such as an AC power line. An installer commissions the occupancy sensing units 102 with a wireless device, such as a laptop computer, smart phone, or personal digital assistant, by sending a commissioning signal to each occupancy sensing unit 102 from the wireless device while walking through the cold-storage facility (as opposed to commissioning each sensing unit 102 by hand).

Once installed, the occupancy sensing units 102 can communicate with each other directly via their respective communications interfaces 160 or indirectly via a central controller, such as the event processor 1006 in the lighting engine 1100. The occupancy sensing units 102 may be coupled to each other (and to the event processor 1000) via a wireless network (e.g., a Zigbee® network) or a wired network (e.g., an Ethernet network). The occupancy sensing units 102 may exchange signals, such as "heartbeat" signals representing current operating status, on a periodic basis. They may also distribute raw or processed occupancy sensing information. For instance, an occupancy sensing unit 102 at the head of a warehouse aisle may detect an occupancy event, then broadcast an indication of the occupancy event to every occupancy sensing unit 102 in the vicinity. Alternatively, the occupancy sensing unit 102 at the head of the warehouse aisle may detect and identify a moving object, predict the object's trajectory, and send indications of the object's predicted trajectory to those occupancy sensing units 102 along the object's predicted trajectory. The notified occupancy sensing units 102 may then activate their respective lighting fixtures 100 to illuminate the predicted trajectory.

In addition to exchanging occupancy information, the occupancy sensing units 102 may identify and compensate for malfunctioning occupancy sensing units 102. Consider an aisle monitored by three occupancy sensing units 102 and illuminated by three lighting fixtures 100 arranged along the aisle. A person must enter the aisle either from one end or from the other, so the middle occupancy sensing units 102 may not be able to detect an occupancy event without one of the other occupancy sensing units 102 seeing occupancy first. If the occupancy sensing units 102 on the ends detect objects moving along the aisle (e.g., they detect occupancy sensing events at an interval about equal to the time it takes to walk from one end of the aisle to the other), they may determine that the middle occupancy sensing unit 102 is broken and activate the middle lighting fixture 100. Similarly, if the middle occupancy sensing unit 102 detects an occupancy event but the occupancy sensing units 102 on the ends of the aisle do not detect anything, the middle occupancy sensing unit 102 may be broken. In some instances, these indications may be used to tune or re-calibrate the gain, offset, and threshold settings of the malfunctioning occupancy sensing unit 102.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the eighth edition as revised in July 2010 of the United States Patent Office Manual of Patent Examining Procedures, Section 2111.03.

What is claimed is:

1. An apparatus for adjusting illumination of a lighting fixture illuminating an environment, the apparatus comprising:
   at least one occupancy sensor to provide sensor data representing at least one occupancy event in the environment illuminated by the lighting fixture;
   a memory, operatively coupled to the at least one occupancy sensor, to log the sensor data provided by the at least one occupancy sensor; and
   at least one processor, operatively coupled to the lighting fixture and the memory, to:
      partition the logged sensor data into a plurality of clusters based on at least one classification parameter;
      adjust a sensor timeout based on at least one cluster in the plurality of clusters, the sensor timeout representing an amount of time between a change in the at least one occupancy event and a change in the illumination of the lighting fixture;
      generate at least one output state based on at least one characteristic of each cluster of at least a subset of the plurality of clusters; and
      adjust the illumination of the lighting fixture based on the at least one output state and the sensor timeout.

2. The apparatus of claim 1, wherein the at least one classification parameter comprises at least one of a time, a temperature, an object velocity, an object direction, and an object size associated with the logged sensor data.

3. The apparatus of claim 1, wherein the at least one classification parameter includes at least two classification parameters, and the at least one processor is configured to partition the logged sensor data by correlating the logged sensor data with the at least two classification parameters.

4. The apparatus of claim 1, wherein the at least one characteristic of each cluster of at least a subset of the plurality of clusters is at least one of a cluster size, a mean value of the at least one classification parameter, a median value of the at least one classification parameter, and a range of the at least one classification parameter.

5. The apparatus of claim 1, wherein the at least one processor is configured to generate the at least one output state by identifying at least one signature associated with the at least one characteristic of each cluster of the at least one subset of the plurality of clusters and comparing the at least one signature to known signatures associated with past occupancy activities.

6. The apparatus of claim 1, wherein the at least one processor is configured to adjust the illumination of the lighting fixture by varying at least one of a plurality of lighting settings of the lighting fixture, the plurality of lighting settings comprising duration, timing, and orientation of the illumination.

7. The apparatus of claim 1, wherein the at least one processor is further configured to analyze at least one of an occupancy pattern, a traffic pattern, and an energy consumption pattern based on the at least one output state.

8. The apparatus of claim 7, wherein the at least one processor is further configured to determine at least one lighting profile for the environment based on at least one of the occupancy pattern, the traffic pattern, and the energy consumption pattern.

9. The apparatus of claim 1, wherein the at least one processor is configured to adjust the illumination based on the at least one output state by applying at least one predetermined operational rule.

10. The apparatus of claim 9, wherein the at least one predetermined operational rule includes a safety rule.

11. The apparatus of claim 1, wherein the at least one processor is further configured to predict a trajectory associated with the at least one occupancy event based on a location and an orientation of the at least one occupancy sensor in the environment.

12. The apparatus of claim 11, wherein the at least one processor is configured to adjust the illumination of the lighting fixture to illuminate the predicted trajectory.

13. The apparatus of claim 1, wherein the at least one processor is further configured to tune the at least one occupancy sensor for the at least one output state based on the at least one characteristic.

14. The apparatus of claim 1, wherein the at least one processor is further configured to adjust a sensing parameter of the at least one occupancy sensor based on the logged sensor data.

15. The apparatus of claim 14, wherein the sensing parameter is at least one of gain, sensitivity, offset, threshold, delay, hysteresis, polling frequency, and polling duty cycle of the at least one occupancy sensor.

16. The apparatus of claim 14, wherein the at least one processor adjusts the sensor timeout of the at least one occupancy sensor in real-time.

17. The apparatus of claim 1, further comprising a communications interface, operatively coupled to the at least one processor, to communicate with at least one external device.

18. The apparatus of claim 17, wherein the at least one external device is the lighting fixture.

19. A method for adjusting illumination of a lighting fixture illuminating an environment, the method comprising:
  acquiring sensor data from at least one occupancy sensor, the sensor data representing at least one occupancy event in the environment illuminated by the lighting fixture;
  partitioning the sensor data into a plurality of clusters based on at least one classification parameter with at least one processor;
  adjusting a sensor timeout based on at least one cluster in the plurality of clusters, the sensor timeout representing an amount of time between a change in the at least one occupancy event and a change in the illumination of the lighting fixture;
  generating at least one output state based on at least one characteristic of each cluster of at least a subset of the plurality of clusters with the at least one processor; and
  adjusting the illumination of the lighting fixture based on the at least one output state and the sensor timeout.

20. The method of claim 19, further comprising:
  predicting a trajectory associated with the at least one occupancy event based on a location and an orientation of the at least one occupancy sensor in the environment; and
  adjusting the illumination of the lighting fixture to illuminate the predicted trajectory.

21. The method of claim 20, further comprising:
  analyzing at least one of an occupancy pattern, a traffic pattern, and an energy consumption pattern based on the at least one output state.

* * * * *

UNITED STATES PATENT AND TRADEMARK OFFICE
CERTIFICATE OF CORRECTION

PATENT NO. : 9,915,416 B2
APPLICATION NO. : 14/645548
DATED : March 13, 2018
INVENTOR(S) : Brian J. Chemel et al.

Page 1 of 1

It is certified that error appears in the above-identified patent and that said Letters Patent is hereby corrected as shown below:

In the Claims

Column 26, Claim 21, Line 40-43:
"21. The method of claim 20, further comprising: analyzing at least one of an occupancy pattern, a traffic pattern, and an energy consumption pattern based on the at least one output state."

Should read:
--21. The method of claim 19, further comprising: analyzing at least one of an occupancy pattern, a traffic pattern, and an energy consumption pattern based on the at least one output state.--

Signed and Sealed this
Tenth Day of July, 2018

Andrei Iancu
*Director of the United States Patent and Trademark Office*